US010850346B2

(12) United States Patent
Nelson et al.

(10) Patent No.: US 10,850,346 B2
(45) Date of Patent: Dec. 1, 2020

(54) COMPOSITION AND METHOD FOR FUSION PROCESSING ALUMINUM ALLOY

(71) Applicant: Raytheon Company, Waltham, MA (US)

(72) Inventors: Norman Dana Nelson, Rowley, MA (US); Ralph P. Mason, Chelmsford, MA (US); Mark J. Pistorino, Wakefield, MA (US)

(73) Assignee: Raytheon Company, Waltham, MA (US)

( * ) Notice: Subject to any disclaimer, the term of this patent is extended or adjusted under 35 U.S.C. 154(b) by 726 days.

(21) Appl. No.: 15/457,312

(22) Filed: Mar. 13, 2017

(65) Prior Publication Data

US 2017/0182595 A1     Jun. 29, 2017

Related U.S. Application Data

(63) Continuation-in-part of application No. PCT/US2016/064435, filed on Dec. 1, 2016.
(Continued)

(51) Int. Cl.
*B23K 15/00*     (2006.01)
*B23K 15/06*     (2006.01)
(Continued)

(52) U.S. Cl.
CPC ........ *B23K 15/0086* (2013.01); *B22F 3/1055* (2013.01); *B23K 9/04* (2013.01);
(Continued)

(58) Field of Classification Search
CPC .. B23K 15/0086; B23K 26/342; B23K 15/02; B23K 15/06; B23K 15/0013;
(Continued)

(56) References Cited

U.S. PATENT DOCUMENTS

| 4,914,268 A | 4/1990 | Hixon |
| 5,294,771 A | 3/1994 | Pratt |

(Continued)

FOREIGN PATENT DOCUMENTS

| CN | 104190930 B | 3/2016 |
| EP | 0 785 043 A1 | 7/1997 |

(Continued)

OTHER PUBLICATIONS 6061 aluminium alloy, Feb. 20, 2009, Wikipedia (Year: 2009).*
(Continued)

*Primary Examiner* — Ibrahime A Abraham
*Assistant Examiner* — Chris Q Liu
(74) *Attorney, Agent, or Firm* — Renner, Otto, Boisselle & Sklar, LLP

(57) ABSTRACT

An aluminum alloy precursor composition and method for fusion processing is provided which reduces hot cracking, improves compositional control, reduces porosity, and/or enhances the mechanical properties of the fusion processed article. The precursor material and fusion process using the same may be utilized for forming an article that meets compositional specifications for aluminum 6061 alloy, while minimizing defects and meeting desired strength and ductility requirements. The fusion process may include a leading energy beam for liquefying the precursor material to form a melt pool, and a trailing energy beam directed toward a trailing region of the melt pool. The trailing energy beam may be configured to enhance agitation and/or redistribution of liquid in the melt pool to prevent hot cracking, reduce porosity, or improve other characteristics of the solidified part. The method also may improve processing parameters, such as adjusting vacuum level to prevent volatilization of alloying elements.

23 Claims, 13 Drawing Sheets

Related U.S. Application Data

(60) Provisional application No. 62/263,288, filed on Dec. 4, 2015.

(51) Int. Cl.

| | | |
|---|---|---|
| *B23K 26/70* | (2014.01) | |
| *B23K 26/073* | (2006.01) | |
| *B23K 26/06* | (2014.01) | |
| *B23K 26/067* | (2006.01) | |
| *B22F 3/105* | (2006.01) | |
| *B33Y 10/00* | (2015.01) | |
| *B33Y 70/00* | (2020.01) | |
| *B23K 26/323* | (2014.01) | |
| *B23K 26/342* | (2014.01) | |
| *B23K 9/04* | (2006.01) | |
| *B23K 26/08* | (2014.01) | |
| *C22C 32/00* | (2006.01) | |
| *C22C 1/04* | (2006.01) | |
| *B23K 26/12* | (2014.01) | |
| *C22C 21/08* | (2006.01) | |
| *B23K 103/10* | (2006.01) | |
| *B22F 3/24* | (2006.01) | |

(52) U.S. Cl.
CPC ............ *B23K 15/004* (2013.01); *B23K 15/06* (2013.01); *B23K 26/067* (2013.01); *B23K 26/0608* (2013.01); *B23K 26/0676* (2013.01); *B23K 26/073* (2013.01); *B23K 26/0734* (2013.01); *B23K 26/0736* (2013.01); *B23K 26/08* (2013.01); *B23K 26/1224* (2015.10); *B23K 26/323* (2015.10); *B23K 26/342* (2015.10); *B23K 26/703* (2015.10); *B33Y 10/00* (2014.12); *B33Y 70/00* (2014.12); *C22C 1/0416* (2013.01); *C22C 21/08* (2013.01); *C22C 32/0036* (2013.01); *B22F 2003/248* (2013.01); *B23K 2103/10* (2018.08)

(58) Field of Classification Search
CPC ............ B23K 15/0046; B23K 26/0608; B23K 26/34; B23K 15/00; B23K 15/004; B23K 15/0093; B23K 26/0604; B23K 26/067; B23K 26/073; B23K 26/1224; B23K 26/32; B23K 26/346; B23K 15/002; B23K 15/0026; B23K 26/032; B23K 26/0613; B23K 26/0676; B23K 26/0734; B23K 26/0736; B23K 26/08; B23K 26/0853; B23K 26/144; B23K 26/147; B23K 26/24; B23K 26/323; B23K 26/703
USPC .............. 219/121.17, 121.14, 121.16, 117.1, 219/121.29, 121.31, 121.64, 121.75, 219/121.76, 121.77, 121.82, 137 R, 76.12, 219/96, 99
See application file for complete search history.

(56) References Cited

U.S. PATENT DOCUMENTS

| | | | |
|---|---|---|---|
| 6,024,792 A | 2/2000 | Kurz | |
| 6,269,540 B1 | 8/2001 | Islam et al. | |
| 6,639,173 B1 * | 10/2003 | Murphy | B23K 15/0013 219/121.14 |
| 8,747,956 B2 * | 6/2014 | Kennedy | B22F 3/115 427/458 |
| 9,527,165 B2 | 12/2016 | Bruck | |
| 2005/0028897 A1 | 2/2005 | Kurz | |
| 2005/0173380 A1 * | 8/2005 | Carbone | B22F 3/1055 219/121.31 |
| 2008/0115863 A1 | 5/2008 | McCrink et al. | |
| 2008/0251504 A1 | 10/2008 | Lu et al. | |
| 2009/0252643 A1 * | 10/2009 | Doty | B22D 21/04 420/533 |
| 2010/0112375 A1 | 5/2010 | Chiovelli | |
| 2010/0270274 A1 * | 10/2010 | Taminger | B23K 15/02 219/121.17 |
| 2011/0008530 A1 | 1/2011 | Woods et al. | |
| 2011/0114839 A1 | 5/2011 | Stecker et al. | |
| 2011/0240607 A1 | 10/2011 | Stecker et al. | |
| 2013/0008879 A1 | 1/2013 | Bichsel | |
| 2014/0134449 A1 | 5/2014 | Kou | |
| 2014/0163717 A1 | 6/2014 | Das et al. | |
| 2014/0230974 A1 * | 8/2014 | Lin | C22F 1/047 148/695 |
| 2014/0259666 A1 | 9/2014 | Baughman et al. | |
| 2015/0044084 A1 | 2/2015 | Hofmann et al. | |
| 2015/0132181 A1 * | 5/2015 | Anderson | C22C 21/06 420/532 |
| 2015/0298213 A1 | 10/2015 | Beyer et al. | |
| 2015/0367446 A1 | 12/2015 | Buller | |
| 2016/0016253 A1 | 1/2016 | Zimmerman | |
| 2016/0175929 A1 * | 6/2016 | Colin | C04B 35/62839 419/23 |
| 2016/0214211 A1 | 7/2016 | Gregg | |
| 2016/0250717 A1 | 9/2016 | Krüger | |
| 2016/0311023 A1 | 10/2016 | Schirtzinger | |
| 2017/0008126 A1 | 1/2017 | Long | |
| 2017/0102689 A1 | 4/2017 | Khajepour | |

FOREIGN PATENT DOCUMENTS

| | | |
|---|---|---|
| WO | 03/031108 A1 | 4/2013 |
| WO | 2014/111707 A1 | 7/2014 |
| WO | 2014/210338 A1 | 12/2014 |
| WO | 2015/092442 A1 | 6/2015 |
| WO | 2017096050 | 6/2017 |

OTHER PUBLICATIONS

6061-T6 Aluminum, Nov. 29, 2014, Makeitforom.com (Year: 2014).*
PCT/US2016/064435; PCT International Search Report and Written Opinion of the International Searching Authority dated Feb. 24, 2017.
"Properties and Selection: Nonferrous Alloys and Special-Purpose Materials" in "Metals handbook—Properties and selection : nonferrous alloys and special-purpose materials", Dec. 31, 1990, pp. 102-103.
Invitation to Pay Additional Fees and Partial International Search Report for corresponding International Application No. PCT/US2018/021653 dated Aug. 2, 2018.
Written Opinion of the International Searching Authority for corresponding International Application No. PCT/US2018/021653 dated Aug. 2, 2018.
Taminger et al.; Electron Beam Freeform Fabrication (EBF$^3$) for Cost Effective Near-Net Shape Manufacturing; NASA/TM-2006-214284; Langley Research Center, Hampton, VA.

* cited by examiner

COMPOSITION AND METHOD FOR FUSION PROCESSING ALUMINUM ALLOY

RELATED APPLICATIONS

This application is a continuation-in-part of PCT International Application No. PCT/US2016/064435 filed Dec. 1, 2016, which claims the benefit of U.S. Provisional Application No. 62/263,288 filed Dec. 4, 2015, all of which are hereby incorporated herein by reference in their entireties.

TECHNICAL FIELD

The present invention relates generally to a composition and method for fusion processing, and more particularly to an aluminum alloy composition and method for fusion processing aluminum alloys, such as for additive manufacturing aluminum alloys susceptible to hot cracking.

BACKGROUND

Aluminum alloys, such as aluminum 6061 alloy, are widely used in modern aerospace and defense structures due to their light weight, relatively high strength, and corrosion resistance. Although strong, aluminum alloys also are easily worked because they are typically malleable and ductile, which allows for traditional fabrication techniques to be utilized, including casting, welding, and machining.

SUMMARY

The present disclosure provides a unique aluminum alloy composition and method of fusion processing that reduces hot cracking, improves compositional control, reduces porosity, and/or enhances the strength and/or ductility of the fusion processed alloy, among other considerations.

More particularly, the present disclosure provides an aluminum alloy precursor material, and fusion process using the same, which may be utilized for forming article(s) that meet the prescribed compositional specifications of aluminum 6061 alloy (Al 6061) after such fusion processing.

The unique aluminum alloy precursor material and/or fusion process in accordance with the present disclosure may provide such Al 6061 articles(s) that are substantially defect free, and which meet or exceed the desired strength and/or ductility requirements for particular application(s).

In accordance with the present disclosure, the present inventors have found that high-energy fusion processing of alloys, such as additive manufacturing or welding of aluminum 6061 alloy, results in vaporization or boiling off of high vapor pressure constituents when the alloy is being processed. This phenomenon may be exacerbated by those processes conducted in a vacuum, but is not limited thereto. It has been found that the vaporization of these high vapor pressure constituents may render the fusion processed alloy with an altered composition compared to the original material, which may result in the fusion processed alloy having a composition and/or exhibiting one or more properties that fall outside of prescribed or desired limits.

For example, the present inventors have found that high energy fusion processing of aluminum 6061 alloy results in a substantial amount of magnesium being lost due to vaporization during such processing. In the aluminum 6061 alloy, magnesium is an alloying agent that contributes to strength of the alloy, particularly during subsequent heat treatment. Thus, the loss of magnesium in the fusion processed alloy may result in decreased strength, decreased heat treat response, and/or have other undesirable characteristics.

In accordance with one aspect of the present disclosure, a unique aluminum alloy composition is provided that enriches the magnesium content in the precursor material for a fusion process, such that the material after fusion processing exhibits the prescribed compositional specifications of conventional aluminum 6061 alloy after the fusion processing.

For example, according to one aspect of the present disclosure, the aluminum alloy precursor composition is based on the Al 6061 alloy, but enriches the magnesium content in an amount from 1.0 to 5.0 weight percent of the precursor alloy, more preferably from greater than 1.2 to 5.0 weight percent, or even more preferably from 2.0 to 3.0 weight percent, such that the resulting fusion processed alloy has a composition in accordance with Aluminum Association *International Alloy Designations and Chemical Composition Limits for Wrought Aluminum and Wrought Aluminum Alloys*—2015 ((incorporated herein by reference) for wrought Al 6061 alloy.

The present inventors also have found that vaporization of high vapor pressure constituents in the alloy during high energy fusion processing may introduce undesirable anomalies in the material after fusion processing, such as porosity.

For example, the present inventors have found that high energy fusion processing of aluminum 6061 alloy results in zinc being lost due to vaporization during such processing. In the aluminum 6061 alloy, zinc may be considered a tramp element (e.g., not added for performance), but may be present in the alloy because it is expensive to completely remove in the refining process, and is often introduced in recycled aluminum. However, the loss of zinc during high energy fusion processing has been found to contribute to porosity in the solidified fusion processed alloy, which may thus reduce strength and/or ductility, among other undesirable characteristics.

In accordance with another aspect of the present disclosure, a unique aluminum alloy composition is provided that minimizes the zinc content in the precursor material for a fusion process, such that the material after fusion processing exhibits less porosity and is preferably defect free.

For example, according to an aspect of the present disclosure, the aluminum alloy precursor composition is based on the Al 6061 alloy, but further restricts the zinc content to no more than 0.005 weight percent of the alloy, with the precursor alloy preferably being free of zinc.

The present inventors also have found that fusion processing techniques that are conducted under vacuum conditions may exacerbate the problem of vaporization of high vapor pressure alloy constituents when the alloy is being processed. For example, some traditional fusion processes may be conducted under vacuum conditions with pressure levels greatly below atmospheric pressure (e.g., less than 100 microtorr), and at elevated processing temperatures sufficient to melt the alloy, which may result in vaporization of some alloy constituents, such as magnesium and zinc, when such processes are utilized.

In accordance with another aspect of the present disclosure, a method of fusion processing is provided in which the process is conducted in a vacuum chamber, and the pressure level of the vacuum chamber is 100 microtorr or greater for reducing vaporization of one or more alloying agents at the processing temperature.

The present inventors also have found that alloys such as Al 6061 alloy are prone to hot cracking during fusion processing where the alloy is liquefied during the process and forms a molten pool which thereafter solidifies. It is believed that during such processes, a volumetric change occurs during the liquid-to-solid phase change of the alloy during solidification, such that shrinkage occurs in the cooler region of the melt pool near the solid interface. Strain in the melt pool caused by such shrinkage may cause porosity or openings to develop in this cooler solidifying region, and if the available supply of liquid metal is insufficient or incapable of filling these openings between the solidifying metal, then hot cracking may occur. The issue of hot cracking may be exacerbated by the formation of dendritic structures in the melt pool, which may form narrow channels between solidifying grains that act to choke off or prevent the liquid metal from replenishing the reduced volume caused by solidification shrinkage. In particular, for some fusion processes where there is a wide solidification temperature range (e.g., about 50 degrees Centigrade or greater) undesirable large dendritic microstructures may be particularly prone to forming during solidification. These dendrites also have low strength at the elevated processing temperatures, which may result in hot tears and porosity that collectively reduce mechanical properties.

In accordance with an aspect of the present disclosure, a unique aluminum alloy precursor composition is provided that includes one or more grain refiners that act as seed materials which promote precipitation of grains in the solidifying region of the melt pool, thereby disrupting growth of large dendritic structures.

For example, according to an aspect of the present disclosure, the aluminum alloy precursor composition is based on the Al 6061 alloy, but specifies titanium to be present in the alloy in an amount from 0.05 to 0.15 weight percent of the alloy, or more preferably from 0.10 to 0.15 weight percent, for restricting dendritic grain growth and reducing hot tearing of the aluminum alloy.

According to another aspect of the present disclosure, the aluminum alloy precursor composition may further include at least one additional grain refiner in addition to titanium.

For example, the at least one additional grain refiner may include boron, titanium-boron, titanium-carbon (e.g., TiC), zirconium, vanadium, and scandium.

In exemplary embodiments, the at least one additional grain refiner may include boron, which may be present in the aluminum alloy precursor material in an amount from 0.001 to 0.05 weight percent, or more preferably from 0.001 to 0.002 weight percent.

In some embodiments, the available boron in the precursor composition is combined with at least a portion of the titanium in the form of titanium diboride, which may further enhance the grain refining effect.

The present inventors also have found that exposing the solidifying region of the melt pool to an energy beam during fusion processing may act to disrupt dendritic grain growth and/or redistribute liquid constituents in the melt pool to prevent hot cracking.

For example, according to another aspect of the present disclosure, a method of fusion processing is provided that includes: providing a raw material in solid state form; exposing the raw material to a leading energy beam thereby liquefying the raw material; forming a melt pool with the liquefied raw material, where the melt pool has a leading region and a trailing region; and exposing the trailing region of the melt pool to a trailing energy beam.

In exemplary embodiments, the raw material used for the exemplary fusion processing method may be any of the foregoing unique aluminum alloy composition(s), alone or in combination, which may be provided in wire or powder form, for example. In other embodiments, the raw material used for the exemplary fusion processing method may be Al 6061 alloy.

The trailing energy beam may be directed toward a liquid-solid region of the melt pool to prevent hot cracking as the melt pool solidifies.

For example, the trailing energy beam may be configured to have a power level, power density, pulsation, beam pattern, and/or positional relationship that is sufficient to break-up or disrupt the formation of dendritic structures in the trailing region of the melt pool.

Alternatively or additionally, the trailing energy beam may be configured to re-heat or re-melt dendritic structures in the melt pool, enhance agitation through convective currents and/or pulsing electromagnetic fields that may cause turbulence in the melt pool, and/or redistribute liquid constituents in the melt pool to replenish lost volume due to solidification shrinkage, among other considerations.

In some embodiments, the trailing energy beam may be configured in a beam pattern that corresponds to a shape of the trailing region of the melt pool.

For example, in some embodiments, the trailing energy beam may be configured in a concave pattern that opens toward the leading region of the melt pool.

In some embodiments, the trailing energy beam may be spaced apart from the leading energy beam at a fixed distance as the respective energy beams move together in a travel direction, such as along an x-y plane relative to a substrate.

In some embodiments, the trailing energy beam may be dynamically altered during the process so as to further enhance agitation of the melt pool and provide a stirring effect from convective currents and/or electromagnetic forces.

For example, in some embodiments, the trailing energy beam may move back and forth at the trailing region, or may cycle through various positions relative to the leading energy beam.

Such process(es) may enhance redistribution of liquid melt from the leading region toward the solidifying portions of the trailing region, which may prevent hot cracking, reduce porosity, and improve strength and ductility of the manufactured part.

Any of the foregoing unique alloy composition(s) and/or foregoing fusion process(es) may be utilized for welding or additively manufacturing.

For example, exemplary welding processes may include: laser beam welding, electron beam welding, arc welding (such as gas metal arc welding, gas tungsten arc welding, plasma arc welding, shielded metal arc welding, etc.), or other forms of welding in which the supply material is liquefied to form a melt pool that is thereafter solidified.

Exemplary additive manufacturing processes may include powder bed techniques, such as Selective Laser Sintering (SLS), Selective Laser Melting (SLM), and Electron Beam Melting (EBM); and direct energy deposition techniques, such as Laser Engineering Net Shape (LENS), powder or wire-based Laser Metal Deposition (LMD), and Electron Beam Additive Manufacturing (EBAM); or other forms of additive manufacturing in which the supply material is liquefied to form a melt pool that is thereafter solidified.

In view of the foregoing, according to an aspect of the present disclosure, an aluminum alloy precursor material for fusion processing is provided, the aluminum alloy precursor material having a chemical composition, in weight % of the aluminum alloy precursor material, including: Al from 50% or greater; Si from 0.40 to 0.80%; Cu from 0.15 to 0.40%;

Mg from 1.0 to 5.0%; Cr from 0.04 to 0.35%; Ti from 0.05 to 0.15%; Fe from 0.0 to 0.7%; Mn from 0.0 to 0.15%; Zn from 0.0 to 0.005%; at least one additional grain refiner, such as boron which may be present from 0.001 to 0.05% and may be combined with at least a portion of the titanium in the form of titanium diboride; one or more other impurities from 0.0 to 0.05% for each of the one or more other impurities, the total amount of the one or more other impurities may be from 0.0 to 0.10%.

According to another aspect of the present disclosure, a method of forming an aluminum alloy article by fusion processing includes: obtaining an aluminum alloy precursor material in solid state form, the aluminum alloy precursor material having a chemical composition, in weight % of the aluminum alloy precursor material, including: Al from 50% or greater; Si from 0.40 to 0.80%; Cu from 0.15 to 0.40%; Mg from greater than 1.2% to 5.0%; Cr from 0.04 to 0.35%; Ti from 0.0 to 0.15%; Fe from 0.0 to 0.7%; Mn from 0.0 to 0.15%; Zn from 0.0 to 0.005%; exposing the aluminum alloy precursor material to at least one direct energy source sufficient to heat and liquefy the precursor material; forming a melt pool with the liquefied precursor material on a substrate, wherein the forming the melt pool with the liquefied precursor material is performed as the at least one direct energy source and/or the substrate move relative to each other in a travel direction; solidifying the melt pool to form the aluminum alloy article, the aluminum alloy article having a chemical composition, in weight % of the aluminum alloy forming the article, including: Al from 50% or greater; Si from 0.40 to 0.80%; Cu from 0.15 to 0.40%; Mg from 0.8 to 1.2%; Cr from 0.04 to 0.35%; Ti from 0.0 to 0.15%; Fe from 0.0 to 0.7%; Mn from 0.0 to 0.15%; Zn from 0.0 to 0.005%.

According to another aspect of the present disclosure, a method of fusion processing includes: obtaining an aluminum alloy precursor material in solid state form, the aluminum alloy precursor material having a chemical composition, in weight % of the aluminum alloy precursor material, including: Al from 50% or greater; Si from 0.40 to 0.80%; Cu from 0.15 to 0.40%; Mg from 0.8 to 5.0%; Cr from 0.04 to 0.35%; Ti from 0.0 to 0.15%; Fe from 0.0 to 0.7%; Mn from 0.0 to 0.15%; Zn from 0.0 to 0.25%; exposing the aluminum alloy precursor material to a leading energy beam, thereby liquefying the precursor material; forming a melt pool with the liquefied precursor material, wherein the melt pool has a leading region and a trailing region; and exposing the trailing region of the melt pool to a trailing energy beam.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

Figure 1:
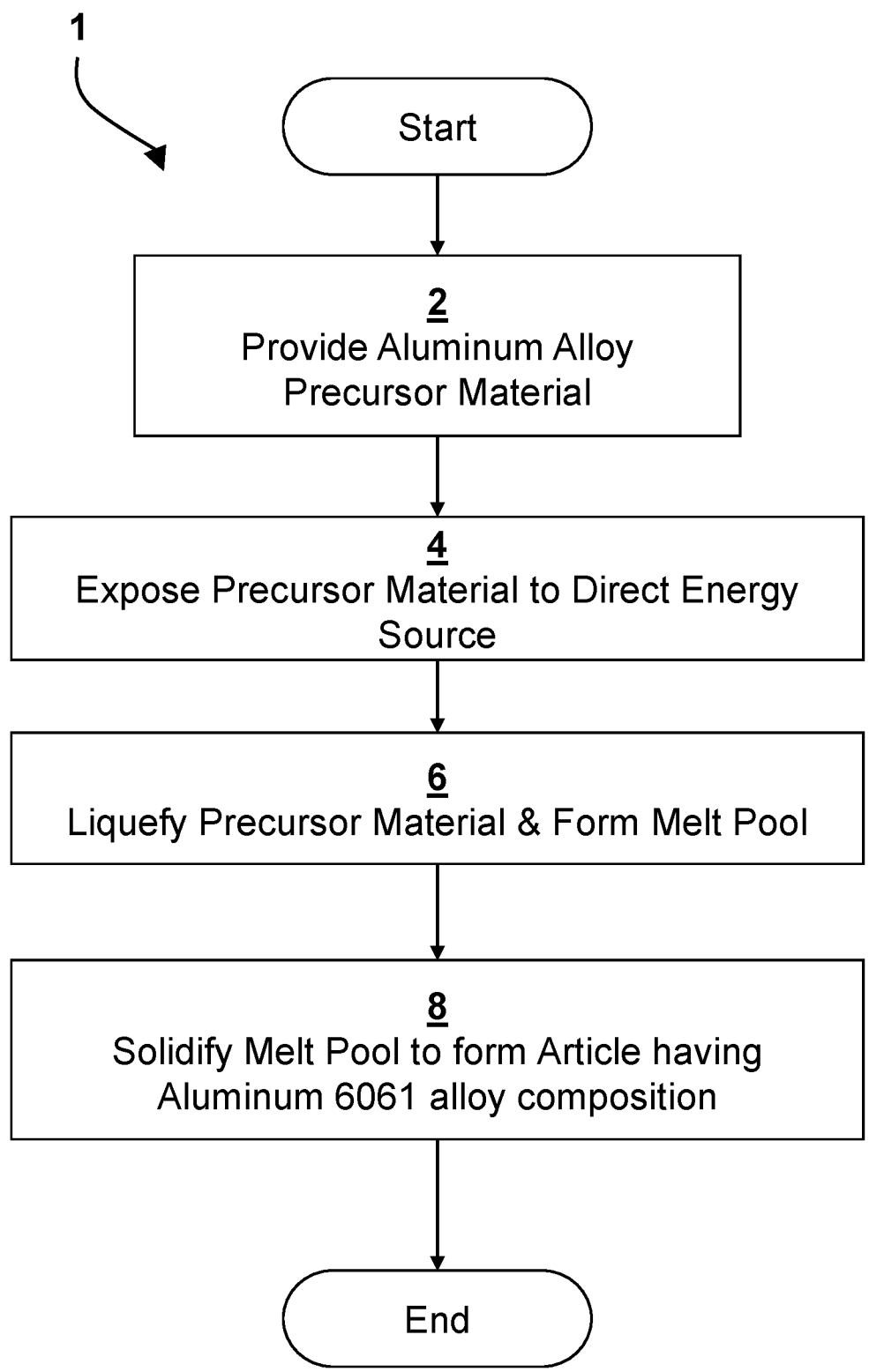
FIG. 1 is a flow chart illustrating an exemplary method of fusion processing according to an embodiment of the invention.

In addition to traditional approaches for working aluminum alloys, other techniques such as additive manufacturing may be beneficial by enabling complex designs to be fabricated with reduced waste and reduced lead times compared to the traditional methods.

While there have been advances in the techniques for welding or additively manufacturing metal alloys, there have been challenges with using welding techniques and/or additive manufacturing techniques with metal alloys that are susceptible to a phenomenon known as hot cracking. Hot cracking is a high-temperature cracking mechanism that is mainly a function of how a metal alloy solidifies from a liquid melt, and thus is a problem for those processes in which a melt pool is formed. Typically, hot cracking occurs during solidification of the melt pool where dendritic structures act to block liquid melt from replenishing regions of the melt pool where volume is lost due to solidification shrinkage. Aluminum alloys, such as aluminum 6061 alloy, may be particularly susceptible to hot cracking, and traditionally have been considered difficult to process via welding and/or additive manufacturing.

The principles and aspects of the present disclosure have particular application to aluminum alloy precursor composition(s) and fusion process(es) for forming aluminum 6061 alloy, and will be described below chiefly in this context. It is also understood, however, that the principles and aspects of this disclosure may be applicable to other manufacturing processes, or other materials, where desirable to: (i) prevent hot cracking and/or reduce porosity of the manufactured article; (ii) enhance the characteristics of the manufactured article, such as material strength, material composition, material heat treatability, stress-relieving or annealing, (iii) improve control over manufacturing process parameters, such as cooling rates or maintaining processing temperatures; (iv) among various other considerations as understood based on the following description.

In accordance with one aspect of the present disclosure, an aluminum alloy precursor material (also referred to as a supply material or raw material) is provided for subsequent fusion processing to produce an aluminum alloy article. As used herein, "aluminum alloy" refers to a metal alloy having aluminum as a base element (e.g., greater than 50% by weight of the alloy composition), and including one or more other alloying elements.

As used herein "fusion processing" refers to a process in which the supplied raw material is at least partially liquefied (or melted) to form a melt pool that is thereafter solidified. Fusion processing includes, but is not limited to, welding processes and additive manufacturing processes.

As used herein, "article" may refer to any item or object formed by the solidified material, including, but not limited to, welds, welded components, solidified layers, and other three-dimensional structures.

The exemplary aluminum alloy precursor material may have a chemical composition that is based on the chemical composition of the Al 6061 alloy, but with modifications to the precursor composition to accommodate for subsequent fusion processing. Generally, the aluminum alloy precursor material includes aluminum as a base element (e.g., greater than 50 wt. %), and also may include alloying elements of silicon, magnesium, copper, and chromium. The exemplary aluminum alloy precursor material also may include titanium and one or more additional grain refiners, as discussed in further detail below. One or more impurities also may be present in the aluminum alloy precursor material. Major impurities may include iron, manganese, and zinc. Minor impurities may include various other elements, as discussed further below.

Silicon (Si) may be included in the precursor aluminum alloy composition for reducing melting temperature and enhancing fluidity. Silicon also may be used to combine with magnesium to produce $Mg_2Si$, which enhances heat-treatability via precipitation hardening. In exemplary embodiments, the silicon is present in the aluminum alloy precursor material in an amount from about 0.4 to about 0.8 weight percent of the aluminum alloy precursor composition. For example, in one or more embodiments, the silicon is present in an amount of about 0.4, 0.45, 0.5, 0.55, 0.6, 0.65, 0.7, 0.75, or 0.8 weight percent of the aluminum alloy precursor composition, including all values and subranges between the stated values.

Copper (Cu) may be included in the precursor aluminum alloy composition for combining with other alloying elements, such as magnesium, to increase strength, particularly after heat treatment. In exemplary embodiments, the copper is present in the aluminum alloy precursor material in an amount from about 0.15 to about 0.40 weight percent of the aluminum alloy precursor composition. For example, in one or more embodiments, the copper is present in an amount of about 0.15, 0.20, 0.25, 0.30, 0.35, or 0.40 weight percent of the aluminum alloy precursor composition, including all values and subranges between the stated values.

Chromium (Cr) may be included in the precursor aluminum alloy composition for controlling grain structure and preventing recrystallization during heat treatment. The chromium also may reduce stress corrosion susceptibility and improve toughness. In exemplary embodiments, the chromium is present in the aluminum alloy precursor material in an amount from about 0.04 to about 0.35 weight percent of the aluminum alloy precursor composition. For example, in one or more embodiments, the chromium is present in an amount of about 0.04, 0.10, 0.15, 0.20, 0.25, 0.30, or 0.35 weight percent of the aluminum alloy precursor composition, including all values and subranges between the stated values.

Magnesium (Mg) may be included in the precursor aluminum alloy composition for combining with other alloying elements, such as silicon, in order to enhance strength, such as via heat treatment and precipitation hardening, among other factors. The magnesium may increase strength without substantially decreasing ductility. The present inventors have found that high-energy fusion processing of aluminum alloys may result in vaporization or boiling off of magnesium when the alloy is being processed. This may be caused by the relatively high vapor pressure of magnesium at the processing temperature during fusion processing. For example, and not limitation, the vapor pressure of magnesium at 652 degrees Celsius is about 3.4 torr. The problem with vaporization of magnesium may be exacerbated when the fusion process is conducted in a vacuum, but is not limited to vacuum processes. The loss of magnesium during fusion processing may render the final fusion processed alloy with a composition that is outside of prescribed compositional limits. In addition, the reduced magnesium content in the fusion processed alloy may decrease the strength, heat treat response, or have other undesirable characteristics.

In exemplary embodiments, the aluminum alloy precursor material has an increased amount of magnesium compared to the aluminum 6061 alloy, such that the precursor material after fusion processing exhibits the prescribed compositional specifications of conventional aluminum 6061 alloy after the fusion processing. In exemplary embodiments, the magnesium is present in the aluminum alloy precursor material in an amount from about 1.0 to about 5.0 weight percent of the aluminum alloy precursor composition. In other embodiments, the magnesium is present in the aluminum alloy precursor material in an amount from greater than 1.2 to about 5.0 weight percent of the aluminum alloy precursor composition. More preferably, in some embodiments, the magnesium is present in the aluminum alloy precursor material in an amount from about 1.3 to about 3.0 weight percent, more particularly about 2.0 to about 3.0 weight percent of the aluminum alloy composition. In one or more embodiments, the magnesium is present in an amount of about 1.0, 1.2, 1.3, 1.4, 1.5, 1.6, 1.7, 1.8, 1.9, 2.0, 2.5, 3.0, 3.5, 4.0, or 5.0 weight percent of the aluminum alloy precursor composition, including all values and subranges between the stated values.

Iron (Fe), manganese (Mn), and/or zinc (Zn) may be present in the aluminum alloy precursor material and may represent impurities or tramp elements that are not specifically added to the alloy for performance.

In exemplary embodiments, the aluminum alloy precursor material may include iron in an amount from about 0.0 up to about 0.7 weight percent of the aluminum alloy precursor composition. For example, in one or more embodiments, the aluminum alloy precursor material is free of iron. In one or more other embodiments, the iron may be present in an amount of about 0.10, 0.20, 0.30, 0.4, 0.5, or 0.35 weight percent of the aluminum alloy precursor composition, including all values and subranges between the stated values.

In exemplary embodiments, the aluminum alloy precursor material may include manganese in an amount from about 0.0 up to about 0.15 weight percent of the aluminum alloy precursor composition. For example, in one or more embodiments, the aluminum alloy precursor material is free of manganese. In one or more other embodiments, the manganese may be present in an amount of about 0.05, 0.10, or 0.15 weight percent of the aluminum alloy precursor composition, including all values and subranges between the stated values.

The present inventors have found that high-energy fusion processing of aluminum alloys may result in vaporization or boiling off of zinc when the alloy is being processed. This may be caused by the relatively high vapor pressure of zinc at the processing temperature during fusion processing. For example, and not limitation, the vapor pressure of zinc at 652 degrees Celsius is about 30 torr. The problem with vaporization of zinc may be exacerbated when the fusion process is conducted in a vacuum, but is not limited to vacuum processes. Because zinc may be considered a tramp element in Al 6061 alloy, its loss during fusion processing may not be a concern for the composition of the final fusion processed alloy. However, the present inventors also have found that vaporization of zinc in the precursor alloy during high energy fusion processing may introduce undesirable anomalies in the final fusion processed alloy, such as porosity, which may reduce strength and/or ductility.

In exemplary embodiments, the aluminum alloy precursor material minimizes the zinc content compared to conventional compositional specifications for the aluminum 6061 alloy, such that the material after fusion processing exhibits less porosity and is preferably defect free. In exemplary embodiments, the aluminum alloy precursor material may include zinc in an amount from about 0.0 up to about 0.005 weight percent of the aluminum alloy precursor composition. For example, in preferred embodiments, the aluminum alloy precursor material is free of zinc. In one or more other embodiments, the zinc may be present in an amount of about 0.001, 0.002, 0.003, 0.004, or 0.005 weight percent of the aluminum alloy precursor composition, including all values and subranges between the stated values.

The present inventors have found that aluminum alloys, such as Al 6061, are prone to hot cracking during fusion processing where the alloy is liquefied during the process and forms a molten pool which thereafter solidifies. It is believed that during such fusion processing, a volumetric change occurs during the liquid-to-solid phase change of the alloy during solidification, such that shrinkage occurs in the cooler region of the melt pool near the solid interface. Strain in the melt pool caused by such shrinkage may cause porosity or openings to develop in this cooler solidifying region, and if the available supply of liquid metal is insufficient or incapable of filling these openings between the solidifying metal, then hot cracking may occur. The issue of hot cracking may be exacerbated by the formation of dendritic structures in the melt pool, which may form narrow channels between solidifying grains that act to choke off or prevent the liquid metal from replenishing the reduced volume caused by solidification shrinkage. In particular, for some fusion processes where there is a wide solidification temperature range (e.g., about 50 degrees Centigrade or greater; or about 125 degrees Fahrenheit or greater), undesirable large dendritic microstructures may be particularly prone to forming during solidification. These dendrites typically have low strength at the elevated processing temperatures, which may result in hot tears and porosity that collectively reduce mechanical properties. The exemplary aluminum alloy precursor material may include one or more grain refiners that act as seed materials which promote precipitation of grains in the solidifying region of the melt pool, thereby disrupting growth of large dendritic structures.

In exemplary embodiments, the aluminum alloy precursor material includes titanium as a grain refiner for restricting dendritic grain growth and reducing hot tearing of the aluminum alloy during fusion processing. In exemplary embodiments, the titanium is present in the aluminum alloy precursor material in an amount from about 0.05 to about 0.15 weight percent of the aluminum alloy composition. More preferably, in some embodiments, the titanium is present in the aluminum alloy precursor material in an amount from about 0.10 to about 0.15 weight percent of the aluminum alloy precursor composition. In one or more embodiments, the titanium is present in an amount of about 0.05, 0.07, 0.09, 0.11, 0.13, or 0.15 weight percent of the aluminum alloy precursor composition, including all values and subranges between the stated values.

The aluminum alloy precursor material also may include one or more other grain refiners. For example, the aluminum alloy precursor material may include boron, titanium-carbon (e.g., titanium carbide, TiC), zirconium, vanadium, and scandium.

In exemplary embodiments, the at least one additional grain refiner includes boron present in the aluminum alloy precursor material in an amount from about 0.001 to 0.05 weight percent of the aluminum alloy precursor composition. More preferably, in some embodiments, the boron is present in the aluminum alloy precursor material in an amount from about 0.001 to about 0.002 weight percent of the aluminum alloy precursor composition. In one or more embodiments, the boron is present in an amount of about 0.001, 0.002, 0.004, 0.006, 0.008, 0.01, 0.02, 0.03, 0.04, or 0.05 weight percent of the aluminum alloy precursor composition, including all values and subranges between the stated values. In some preferred embodiments, at least a portion of the boron added to the alloy is combined with at least a portion of the titanium in the form of titanium diboride ($TiB_2$), and more preferably all of the available boron is combined with at least some of the titanium in the form of titanium diboride. During fusion processing, the titanium diboride (or other grain refiners) may readily precipitate out of solution in the melt pool of the liquefied precursor material, thereby forming seed crystals that promote an increased amount of smaller grains in the solidifying region of the melt pool, which disrupts growth of large dendritic structures.

The aluminum alloy precursor material also may include some additional impurities (also referred to as minor impurities). For example, the minor impurities may include antimony, arsenic, beryllium, bismuth, cadmium, calcium, carbon, cerium, cobalt, gallium, hydrogen, indium, lead, lithium, mercury, molybdenum, nickel, niobium, phosphorus, zirconium, vanadium, or various other elements from the period table. In exemplary embodiments, the aluminum alloy precursor material may include each minor impurity in an amount from about 0.0 up to about 0.05 weight percent of the aluminum alloy precursor composition. In exemplary embodiments, the combined total for all of these minor impurities in the aluminum alloy precursor material may be in an amount from about 0.0 up to about 0.10 weight percent weight percent of the aluminum alloy precursor composition.

In exemplary embodiments, the aluminum alloy precursor material includes aluminum in an amount that constitutes the balance of the alloy composition, in weight percent, after all alloying elements and impurities have been accounted for and/or added. In exemplary embodiments, aluminum is present in the aluminum alloy precursor material in an amount of 50 weight percent or greater, for example, in an amount of about 55, 60, 65, 70, 75, 80, 85, 90, 95, or more weight percent of the aluminum alloy precursor composition. In some preferred embodiments, the aluminum is present in an amount of from about 90 to 99 weight percent of the aluminum alloy precursor composition, such as about 91, 92, 93, 94, 95, 96, 97, 98, or 99 weight percent, including all values and subranges between the stated values. In some preferred embodiments, the aluminum is present in an amount from about 92.2 to about 98.4 weight percent of the aluminum alloy precursor composition, such as about 92.2, 92.265, 93, 94, 95, 96, 97, 98, 98.359, or 98.4 weight percent, including all values and subranges between the stated values.

In view of the foregoing, one preferred embodiment the exemplary aluminum alloy precursor material may have a composition as shown in Table 1. In the embodiment illustrated in Table 1, all of the boron in the alloy composition is combined with titanium in the form of titanium diboride, although it is understood that in some embodiments this may not be the case. It is also understood that the aluminum alloy precursor material is not limited to the composition shown in Table 1, and may include one or more other additional elements, or may exclude one or more of the listed elements, which may be selected in a suitable manner depending on the fusion processing conditions, desired composition and/or properties of the final fusion processed article, among other considerations as understood by those having ordinary skill in the art.

TABLE 1

Chemical Composition of Exemplary Aluminum Alloy Precursor Material

| Element | Minimum (wt. %) | Maximum (wt. %) |
|---|---|---|
| Silicon | 0.40 | 0.80 |
| Iron | 0.0 | 0.7 |
| Copper | 0.15 | 0.40 |
| Manganese | 0.0 | 0.15 |
| Magnesium | 1.0 | 5.0 |
| Chromium | 0.04 | 0.35 |
| Zinc | 0.0 | 0.005 |
| Titanium | 0.05 | 0.15 |
| Boron (as $TiB_2$) | 0.001 | 0.05 |
| Minor Impurities - Each | 0.0 | 0.05 |
| Minor Impurities - Total | 0.0 | 0.10 |
| Aluminum | balance | balance |

Turning to FIG. 1, a flow chart illustrating an exemplary fusion process 1 is shown. The process includes providing an aluminum alloy precursor material, which may be any of the foregoing embodiments of the exemplary aluminum alloy precursor material described above. The precursor material may be provided in solid state form, such as in wire or powder form. It is understood, however, that the precursor material may be provided in different forms (e.g., fed via a dispenser as a powder spray, or provided as a powder bed), which may depend on the particular fusion process (e.g., type of welding, type of additive manufacturing, etc.) as would understood by those having ordinary skill in the art.

At step 4, the precursor material is exposed to a direct energy source. The direct energy source may be emitted from a suitable device, and should have sufficient energy to heat the precursor material beyond its melting point (e.g., beyond a temperature of a solidus line representative of the alloy composition). For example, and not limitation, the direct energy source may have sufficient energy to heat the aluminum alloy precursor material to at least about 580 degrees Celsius, and more particularly in the range of about 580 degrees Celsius to about 652 degrees Celsius, or greater. The direct energy source (also referred to generally as an energy beam) may be an electron beam, laser beam, electric arc, plasma arc, or other similar direct energy source, which may depend on the particular fusion process (e.g., type of welding, type of additive manufacturing, etc.) as would understood by those having ordinary skill in the art.

At step 6, the precursor material is heated beyond its melting point to liquefy the precursor material and form a melt pool. The melt pool may be formed on a substrate, such as in the form of a molten pool deposit. The substrate upon which the melt pool is formed may include a support platform, one or more pieces being welded, a powder bed, a previously re-solidified layer of the fusion processed alloy, or any other suitable substrate capable of receiving and supporting the melt pool. In exemplary embodiments, the melt pool may be formed with the liquefied precursor alloy as the direct energy source moves in a travel direction along an x-y plane relative to the substrate. In this manner, it is understood that either the device emitting the direct energy source, the substrate, or both may move relative to each other. Furthermore, the x-y plane may be an arbitrary frame of reference, and may include one or more planes other than horizontal.

At step 8, when the melt pool has solidified, it forms a fusion processed article having an aluminum alloy composition. The article may be one or more welds, welded components, solidified layers, three-dimensional structures, and/or other suitable article(s), which may depend on the particular fusion process (e.g., type of welding, type of additive manufacturing, etc.) as would understood by those having ordinary skill in the art. For example and not limitation, in an additive manufacturing process, the solidified melt pool may form a layer, or trace, that trails the path taken as the direct energy source device and/or substrate move relative to each other along the x-y plane. These layers may be deposited adjacent to each other along the x-y plane, and/or on top of each other along a z-axis that is orthogonal to the x-y plane, so as to build the three-dimensional article re-solidified layer by re-solidified layer.

In exemplary embodiments, the solidified article has a composition that corresponds with the standard composition of aluminum 6061 alloy according to the Aluminum Association *International Alloy Designations and Chemical Composition Limits for Wrought Aluminum and Wrought Aluminum Alloys*—2015 for wrought Al 6061 alloy, as shown in Table 2, where absent values indicate unspecified limits.

TABLE 2

Chemical Composition of Aluminum 6061 alloy per Aluminum Association International Alloy Designations and Chemical Composition Limits for Wrought Aluminum and Wrought Aluminum Alloys (2015)

| Element | Minimum (wt. %) | Maximum (wt. %) |
|---|---|---|
| Silicon | 0.40 | 0.80 |
| Iron | — | 0.7 |
| Copper | 0.15 | 0.40 |
| Manganese | — | 0.15 |
| Magnesium | 0.8 | 1.2 |
| Chromium | 0.04 | 0.35 |
| Zinc | — | 0.25 |
| Titanium | — | 0.15 |
| Other Elements - Each | — | 0.05 |
| Other Elements - Total | — | 0.15 |
| Aluminum | Remainder | remainder |

Although filler materials are known to facilitate welding of aluminum alloys, these filler materials may degrade the alloy properties or composition, making the final component unusable in certain applications such as aerospace. In one or more preferred embodiments, the fusion process 1 is carried out only with the supplied aluminum alloy precursor material in its solid state form (e.g., by liquefying the wire or powder), and without adding one or more additional materials (e.g., alloying elements or filler materials) to the melt pool that would change its chemistry. In this manner, it is understood that in exemplary embodiments the maximum values for each element listed in the composition of the precursor material (e.g., Table 1) may constitute maximum values for each element listed in the composition of the fusion processed aluminum alloy (e.g., Table 2)—for example, if zinc has a specified upper limit of 0.005 wt. % in the precursor material, this also may be the expected upper limit in the fusion processed alloy. In addition, although it is understood that the content of some elements in the precursor material may be lost during the fusion process, such as by vaporization of the high vapor pressure constituents discussed above, it is also understood that depending on the processing parameters the precursor material may undergo only a physical change (e.g., from solidified form to re-solidified form), and not necessarily a chemical or compositional change.

After step 8, the fusion processed aluminum alloy article optionally may be heat treated. For example, the fusion processed alloy may be stress relieved, fully annealed, solution annealed, quenched, aged, hot isostatically pressed, or processed according to other suitable heat treatments. In exemplary embodiments, the fusion processed alloy may have the composition of an aluminum 6061 alloy which is annealed (also referred to as O heat treatment) and has as maximum tensile strength no more than 152 MPa (22,000 psi), maximum yield strength no more than 83 MPa (12,000 psi), and has elongation of at least 18%. In other exemplary embodiments, the fusion processed alloy may have the composition of an aluminum 6061 alloy which is subsequently solution annealed, quenched, and naturally aged to a standard heat treatment designation of T4 and has an ultimate tensile strength of at least 210 MPa (30,000 psi), yield strength of at least 110 MPa (16,000 psi), and elongation of at least 16%. In other exemplary embodiments, the fusion processed alloy may have the composition of an aluminum 6061 alloy which is subsequently solution annealed, quenched, and artificially aged to a standard heat treatment designation of T6 and has an ultimate tensile strength of at least 290 MPa (42,000 psi), yield strength of at least 240 MPa (35,000 psi), and elongation of at least 9%. These strength characteristics agree with American Society for Testing and Materials specification B209 for aluminum and aluminum-alloy sheet and plate (incorporated by reference).

In exemplary embodiments, the fusion process 1 may be conducted under inert or vacuum conditions to reduce the formation of oxides in the melt pool. For example, the process may be carried out in a vacuum or inert environment, such as by backfilling the chamber with an inert gas, for example, helium, argon, or other suitable gas that does not detrimentally react with the melt pool. In exemplary embodiments, the vacuum level used during an exemplary fusion process 1 may be decreased compared to traditional fusion processing parameters, bringing the pressure level closer to atmospheric pressure (but still below atmospheric pressure) so as to prevent or reduce vaporization of one or more alloying agents or impurities (such as magnesium or zinc) during the fusion process, which may thereby reduce hot cracking and/or reduce internal porosity in the additively manufactured article. It is understood, however, that some fusion processes may be limited to a maximum pressure level in the vacuum chamber based on limitations of the fusion processing apparatus. For example, during an electron beam fusion process, increasing the pressure level to greater than 3,000 microtorr may affect electron beam characteristics (e.g., increased attenuation of the electron beam caused by a scattering effect of the atmosphere in the chamber), or may affect EB gun discharging (e.g., metal vapor or positive ions entering the EB gun and causing electric arcs that may lead to breakdown or interruption during the process). As such, although it would be advantageous to reach or exceed the vapor pressure of the alloying agent at the processing temperature, such elevated pressure levels may not be practical for some fusion processes. In exemplary embodiments, the pressure level in the vacuum chamber may be about 100 microtorr or greater, and more preferably about 500 microtorr or greater, for reducing vaporization of alloying agents at the processing temperature. For example, the pressure level in the vacuum chamber may be about 600, 700, 800, 900, 1000, 1250, 1500, 1750, 2000, 2250, 2500, 2750, 3000 microtorr, or more, including all ranges and subranges therebetween.

In exemplary embodiments, one or more parameters of the exemplary fusion process 1 may be optimized to reduce hot cracking during fusion processing. By way of example, and not limitation, one or more of the following parameters may be varied: total power of the emitted energy beam, travel speed (e.g., relative speed between the energy beam emitting device and the substrate), raw material feed rate (e.g., wire feed rate), raw material size (e.g., wire diameter or powder size), size of the deposited article(s) (e.g., size of the weld or layer), and interpass temperature. As will be described in further detail below with reference to method 100 in FIG. 4, the exemplary fusion process 1 may utilize more than one energy beam (or a single rastered beam), each of which may be directed toward different regions of the melt pool. For example, a leading energy beam may be used for liquefying the precursor material, and a trailing energy beam may be directed toward a solidifying region (e.g., liquid-solid region) of the melt pool to prevent hot cracking as the melt pool solidifies. In exemplary embodiments of the fusion process 1, the trailing energy beam may be configured to have a power level, power density, pulsation, beam pattern, and/or positional relationship that is sufficient to break-up or disrupt the formation of dendritic structures in the trailing region of the melt pool. Alternatively or additionally, in exemplary embodiments of the fusion process 1, the trailing energy beam may be configured to re-heat or re-melt dendritic structures in the melt pool, enhance agitation through convective currents and/or pulsing electromagnetic fields that may cause turbulence in the melt pool, and/or redistribute liquid constituents in the melt pool to replenish lost volume due to solidification shrinkage, among other considerations.

The exemplary fusion process 1 may be used for welding, additive manufacturing, or other fusion processes in which the supply material is liquefied and thereafter solidified. Exemplary welding processes may include: laser beam welding, electron beam welding, or arc welding (such as gas metal arc welding, gas tungsten arc welding, plasma arc welding, shielded metal arc welding, etc.), for example. Exemplary additive manufacturing processes may include powder bed techniques, such as Selective Laser Sintering (SLS), Selective Laser Melting (SLM), and Electron Beam Melting (EBM); and direct energy deposition techniques, such as Laser Engineering Net Shape (LENS), powder or wire-based Laser Metal Deposition (LMD), and Electron Beam Additive Manufacturing (EBAM), for example. In this manner, it is understood that the direct energy source (or energy beam) for electric arc processes is at least one electric arc, for plasma processes is at least one plasma arc, for laser processes is at least one laser beam, and for electron beam processes is at least one electron beam. It is also understood that the precursor material may be provided in wire, powder, or other form depending on the fusion process.

Figure 2:
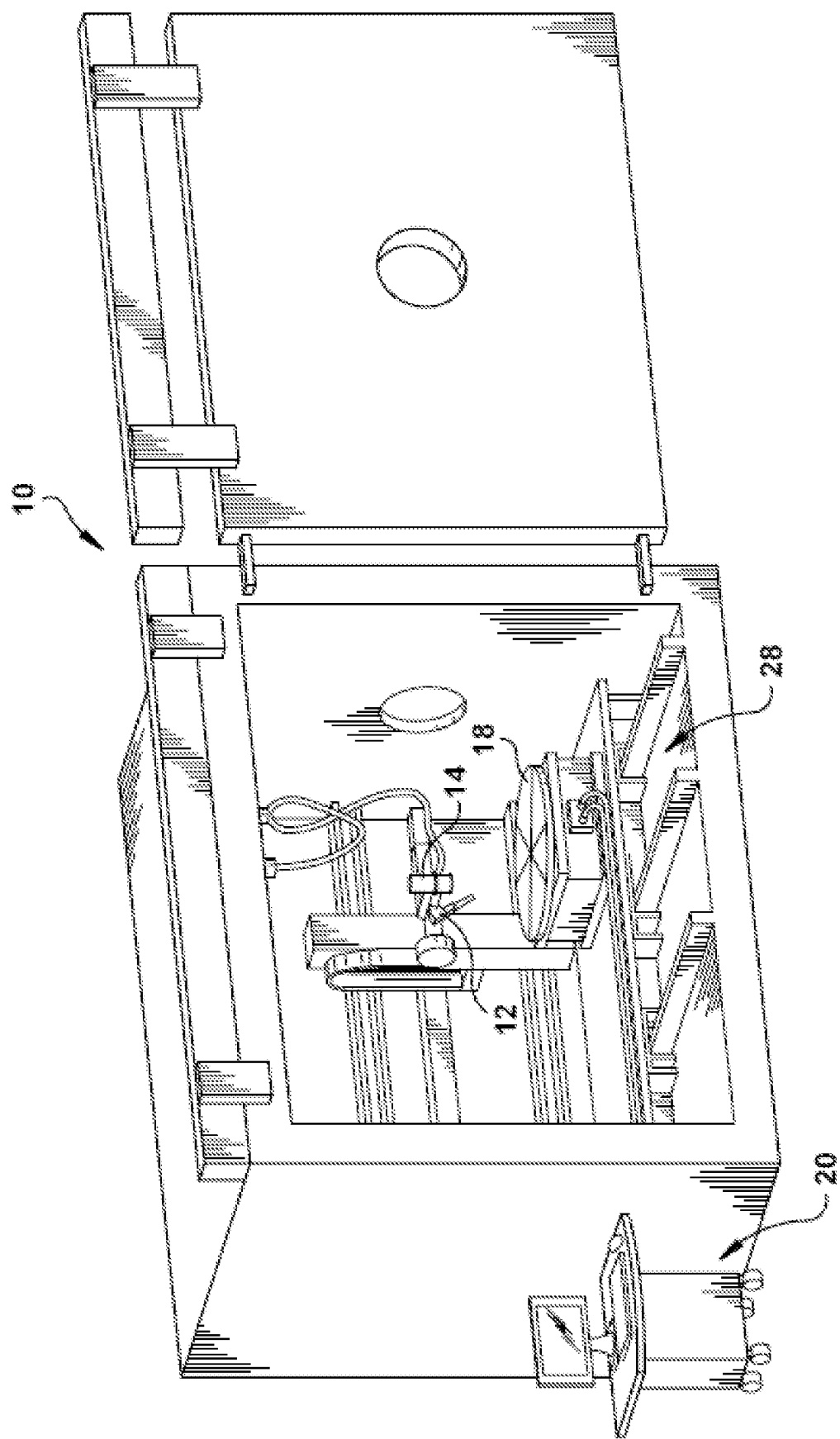
FIG. 2 is a schematic view of an exemplary additive manufacturing apparatus according to an embodiment of the invention.
Figure 3:
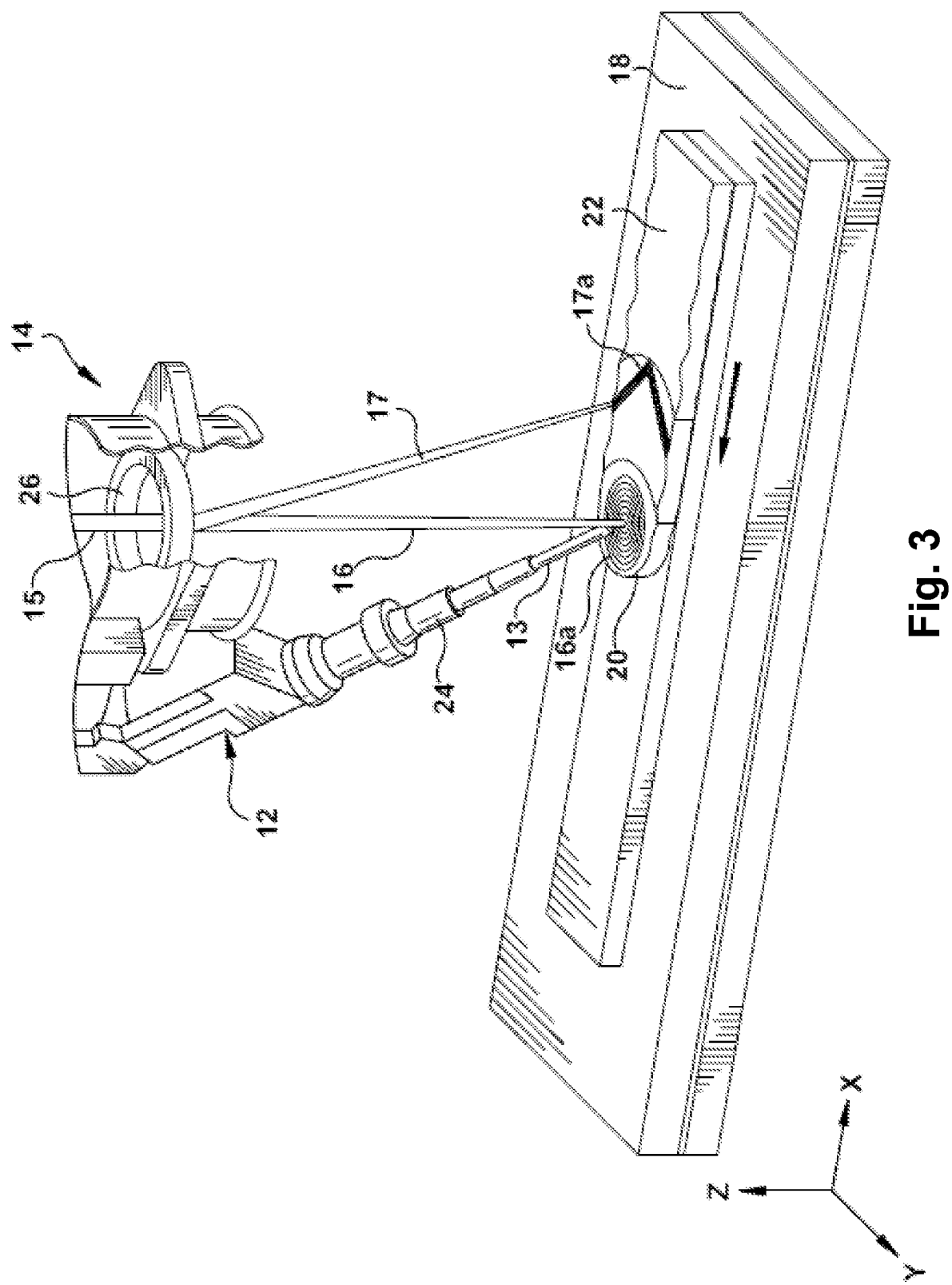
FIG. 3 is an enlarged schematic view of components of the additive manufacturing apparatus in FIG. 1, which are shown during an exemplary additive manufacturing process according to an embodiment of the invention.

Turning to FIGS. 2 and 3, an exemplary electron beam additive manufacturing (EBAM) apparatus 10 is shown, which may be utilized for fusion processing the above-described aluminum alloy precursor material (or other materials) to form a three-dimensional article, for example. The EBAM apparatus 10 includes at least one material delivery device 12 for delivering raw material 13 in solid state form to a feed region, and an energy source 14 (also referred to as an energy emission device 14), such as an electron beam (EB) generator (e.g., EB gun) that controllably emits at least one energy beam 16, such as an electron beam, for applying energy to liquefy the raw material delivered by the material delivery device 12 at the feed region. A work piece support 18 may be provided for receiving the liquefied raw material. The work piece support 18 may form a substrate, or may support a substrate, onto which the liquefied raw material is deposited as a molten pool deposit 20. As discussed in further detail below, the liquefied raw material in the molten pool deposit 20 solidifies to form a re-solidified layer 22 (shown in FIG. 3, for example), which thereby becomes the substrate upon which additional re-solidified layers are formed. In this manner, the EBAM apparatus 10 may build upon each re-solidified layer to form a three-dimensional article layer-by-layer.

In exemplary embodiments, the raw material 13 is a metal wire, which may be fed with the material delivery device 12 via an actuator or other suitable device at a controlled feed rate. The wire may be fed into the molten pool 20 established by the electron beam 16 though a suitable guide nozzle 24. The distance between the electron beam 16 and the molten pool 20 of the additively manufactured article may be controlled, along with the feed rate, such that the raw material 13 being deposited is a generally continuous stream of material from the feed wire to the molten pool deposit 20, so as to avoid droplets or other discontinuities, or to avoid accumulation and premature solidification. In exemplary embodiments, the material delivery device 12 may accommodate wire feed rates up to about 300 inches per minute (IPM) with wire diameters ranging from about 0.030 inches to about 0.156 inches, or more. The material delivery device 12 may be adjustable for feeding relatively large or relatively small diameter wires, for example, wire diameters below about 7 mm, below about 5 mm, or below about 3 mm, or below about 1 mm. The material delivery device 12 may be adjustable for feeding the wire at relatively high and relatively low feed rates, for example, below about 300 IPM, below about 200 IPM, below about 100 IPM, or below about 50 IPM.

In exemplary embodiments, the raw material 13 is the aluminum alloy precursor material having the composition(s) described above (e.g., Table 1), which may be utilized for forming an article having an aluminum 6061 alloy composition (e.g., Table 2). It is understood, however, that in one or more other embodiments, the raw material 13 may include one or any combination of metals or alloys (e.g., metals including a transition metal or an alloy thereof). For example, the raw material 13 may include one or more of titanium, aluminum, iron, nickel, chromium, cobalt, stainless steel, niobium; tantalum, copper, bronze, brass, beryllium, copper, vanadium, or tungsten. In exemplary embodiments, particular examples of the raw material include aluminum or other aluminum alloys, such as Al 6061. Other particular examples include other aluminum alloys (e.g., 6xxx-series having Mg and Si; 2xxx-series having Cu; and 7xxx-series having Zn). It is understood that the foregoing examples of raw materials are for illustration and not limitation, and the exemplary apparatus and process described herein may be utilized for any raw material, and may be particularly useful for raw materials that are susceptible to hot cracking during solidification of a melt pool, among other considerations as discussed below.

The energy beam generation device 14 may expose the raw material 13 to sufficient energy to heat the raw material beyond its melting point (e.g., beyond a temperature of a solidus line representative of the alloy composition). By way of example and not limitation, a suitable electron beam gun may provide energy in the form of a stream of focused electrons accelerated towards the raw material in the feed region by a relatively high voltage potential (e.g., greater than about 15 kilovolts, such as about 30 kilovolts, about 60 kilovolts, about 100 kilovolts, or even about 150 kilovolts, or higher). The electrons may be generated within the EB gun via one or more heated filaments. The power output of the EB gun typically may be controlled by limiting or throttling the flow of electrons toward the feed region. For example, beam current may be greater than about 50, 100, 200, 300, 400 milliamps or more. The total power output level of the emitted electron beam may be about 1 kilowatt to about 30 kilowatts, for example, greater than about 1, 2, 4, 6, 8, 10, 20 kW or more. One approach to the operation of an electron beam gun may be to maintain the parameters of the gun at a sufficient level so that the maximum depth of a molten pool deposit may be maintained substantially constant at a depth less than about 3 cm, such as about less than about 1 cm, and possibly even less than about 0.5 cm.

In exemplary embodiments, the electron beam generation device 14 may be controllably operated and may include a suitable mechanism for directing the location of an emitted energy beam 15, which may thereby be directed at point locations such that two or more preselected power densities can be applied over two or more preselected regions. It is possible that the emitted energy beam 15 may be operated in a generally defocused mode, a generally focused mode, or both. In an exemplary embodiment, the emitted energy beam 15 may be operated in a mode that maintains a generally constant focus of the beam, which is deflected and translated during subsequent raster frames. For example, a beam having a width of about 0.5 to about 0.8 mm may be rastered to cover an effective width of about 1.0, 2.0, 3.0 mm, 10 mm, or larger. In this manner, a relatively large amount of energy may be dispersed over a relatively large area, but to a relatively shallow depth, as compared with traditional electron beam welding.

One approach for utilizing such rastering may involve the use of an electron beam generating device that provides for focusing and/or deflecting the electron beam, and directing point location, by using one or more deflection coils, such as one or more programmable electromagnetic coils 26. The step of emitting the electron beam 15 during successively repeating steps may include emitting the beam using a substantially constant clock rate throughout the repeating steps, and the translating of the electron beam may include deflecting the beam with the one or more electromagnetic coils 26. The translating step may include translating from point to point at a substantially constant clock rate, and throughout the steps a substantially constant frame rate may be employed. A substantially constant frame rate of about 50 Hz to about 1 kHz or more, for example, about 100 Hz, 200 Hz, 400 Hz, 800 Hz or more may be employed; or a clock rate in excess of 1 MHz (e.g., about 1.4 MHz) may be employed; or both. In addition, the operation of the EB gun may be configured so that there is synchronicity between the programmed beam raster path and one or more control signals. For example, a suitable control system may control the operation of the electron beam generating device such as its power, current, voltage, beam characteristic, or any combination thereof.

In exemplary embodiments, the emitted energy beam 15 may be rastered to form one or more beam patterns. For example, as shown in FIG. 3 and discussed in further detail below, the emitted energy beam 15 may be deflected and translated through a raster pattern to include a leading energy beam pattern 16a defined by a leading energy beam 16, and a trailing energy beam pattern 17a defined by a trailing energy beam 17. It is understood that although shown as two separate and simultaneous energy beams 16, 17, the rastering of the single emitted beam 15 is translated from point to point to define the respective patterns 16a, 17a. Thus, it is understood that the leading energy beam 16 (e.g. leading energy beam pattern 16a) and the trailing energy beam 17 (e.g., trailing energy beam pattern 17a) as used herein may refer to the respective beams as provided by such rastering. The rastering of the emitted beam 15 may, during one or more individual frames, transfer a differential in density of heat delivered per unit time as between at least two regions of a frame, such as a differential in power level or power density as between at least two regions. In this manner, the distribution of the total power level of the emitted beam 15 may be split between the leading energy beam 16 and the trailing energy beam 17, or the power density applied over the area defined by the respective patterns 16a, 17a may be split. For example, the total power level may be split between the leading energy beam (L) and the trailing energy beam (T) by a ratio (L:T) of about 25:75, 50:50, 60:40, 70:30, 75:25, 80:20, 85:15, 90:10, 95:5, 96:4, 97:3, 98:2, or 99:1, including all subranges therebetween. It is understood that although shown and described as utilizing a rastering methodology, the at least two separate regions may be exposed to at least two separate energy beams (e.g., 16, 17), which may be emitted from at least two different energy sources, and which may form respective patterns (e.g., 16a, 17a) in any suitable manner.

The work piece support 18, the electron beam generator 14, and/or the material delivery device 12 may be positionally translatable relative to each other. In this manner, the energy beam (e.g., 15, 16, 17) may move in a travel direction, at a travel speed, relative to the substrate (shown with an arrow in FIG. 3, for example) so that the additively manufactured article may be formed layer-by-layer from a plurality of successively deposited (and solidified) molten pool deposits. The travel speed may be relatively fast or relatively slow, for example, 10 IPM or more, such as 15 IPM, 25, IPM, 50 IPM, or 100 IPM, or more. In exemplary embodiments, the energy beam generation device 14 may be translatable in a plurality of axes (e.g., 3, 4, 5 or 6 axes) relative to the work piece support 18 (the latter of which may itself be fixed or translatable). It is understood that the energy beam (e.g., leading energy beam) moving in a travel direction along an x-y plane means that the energy beam moves relative to the substrate, whether it is the energy beam generating device that moves or the substrate that moves. For example, it is understood that the energy beam generation device 14 may be fixed in position, and the work piece support 18 may be moved to various positions relative to the energy beam generation device.

A suitable housing defining a chamber 28 may be employed to enclose at least the material delivery device 12, the electron beam generator 14, and/or the work piece support 18. The chamber 28 may be configured as a vacuum chamber, which may be evacuated as desired for processing. The pressure may be evacuated with one or more suitable vacuum pumps so that the pressure within the chamber ranges from about 5,000 microtorr to about 30 microtorr, or lower, such as about 4,000 microtorr, 3,000 microtorr, 2,000 microtorr, 1,000 microtorr, 500 microtorr, 100 microtorr, or lower. A suitable vacuum pumping arrangement utilizing a combination of mechanical and oil diffusion pumps may be used. The chamber 28 may be such that it provides for suitable vacuum sealing and radiation shielding, and is sufficiently large to house the components necessary for work piece manufacture. For example, a stainless steel chamber may be employed. The internal chamber dimensions may be at least about 48 in.×48 in.×60 in., such as about 68 in.×68 in.×92 in. (L×W×H), or about 48 in.×48 in.×228 in. (L×W×H), or more.

In exemplary embodiments, one or more sensors may be provided for receiving information about one or more processing parameters, or parameters associated with the additively manufactured article. For example, such parameters may include, but are not limited to, wire feed rate, travel speed, position, temperature, power level, voltage potential, beam current, rastering, radiation, etc.

A control system 20 with a suitable controller (which may include at least one microprocessor) may be configured to receive information from the sensors about the processing conditions, such that the controller may change an operating parameter in response to the monitored condition. The control system 20 may be in signal communication with one or more of the material delivery device 12, energy emission device 14, work piece support 18 and/or sensors. For example, the control system 20 may control the operation of the energy emission device 14 such as its translatable position; total power level; total current level; total voltage potential; leading and/or trailing energy beam characteristic(s), including their respective beam patterns, pulsing characteristics, positional relationships, power levels, power densities, voltages, and/or currents; or any combination thereof. The control system 20 may receive instructions from a 3D model having fabrication instructions that, when carried out by the EBAM apparatus 10, result in the fabrication of the desired article. One or more of the controls and data acquisition may be electronically managed through a user interface and display device (e.g., suitable instrumentation, such as one or more computers).

In exemplary embodiments, the process may be performed to fabricate a three-dimensional article (e.g., metallic article) at a rate of about 0.5 cm$^3$/hr to about 3,600 cm$^3$/hr, such as about 1.0, 10, 50, 100, 200, 400, 800, 1,000 cm$^3$/hr, or higher. The process may also be performed to fabricate an article (e.g., metallic article) at a rate of at least about 2.5, 3.0, 3.3, 5 or even 10 kg/hour (e.g. having an average bead width of about 10 to about 15 mm). The steps may be performed at a rate sufficient to deposit the raw material as a plurality of molten pool deposits, or beads, that define successive layers having an average bead width of about 10 to about 15 mm (e.g., about 12.7 mm) at a rate of at least about 25 cm of bead per minute (e.g., about 35 to 80 cm per minute or higher). The process may be interrupted for a period (e.g., of at least one minute, one hour, two hours, one day, or longer) prior to completion of the article, and may be resumed after complete solidification of the article occurs.

In some embodiments, the EBAM apparatus 10 may include one or more components as found in the Sciaky model NG1 VX68. For example, suitable components and apparatus that may be employed in the present teachings include, without limitation, a fully functioning electron beam welding and deposition system utilizing a low voltage moving gun technology, which may include six programmable CNC motion axes including XYZ linear and part rotation (R), part tilt (T), and electron beam gun tilt axes. An electron beam gun such as the Sciaky low voltage 60/60 style electron beam gun may be employed. The entire system may be programmed and controlled via Sciaky's W20XX series CMC and process controller. It is also possible that the teachings herein may employ a separate dedicated computer in addition to the NG1 system controller. Such computer may be configured, for example, to provide a communication link to the NG1 primary controller via Ethernet and may allow for bidirectional data transfer. In some embodiments, the teachings herein may utilize the apparatus and method disclosed in U.S. Application Publication No. 2011/0240607 filed Feb. 17, 2011, which is incorporated herein by reference in its entirety, including, but not limited to, the use of closed-loop control as described therein.

Figure 4:
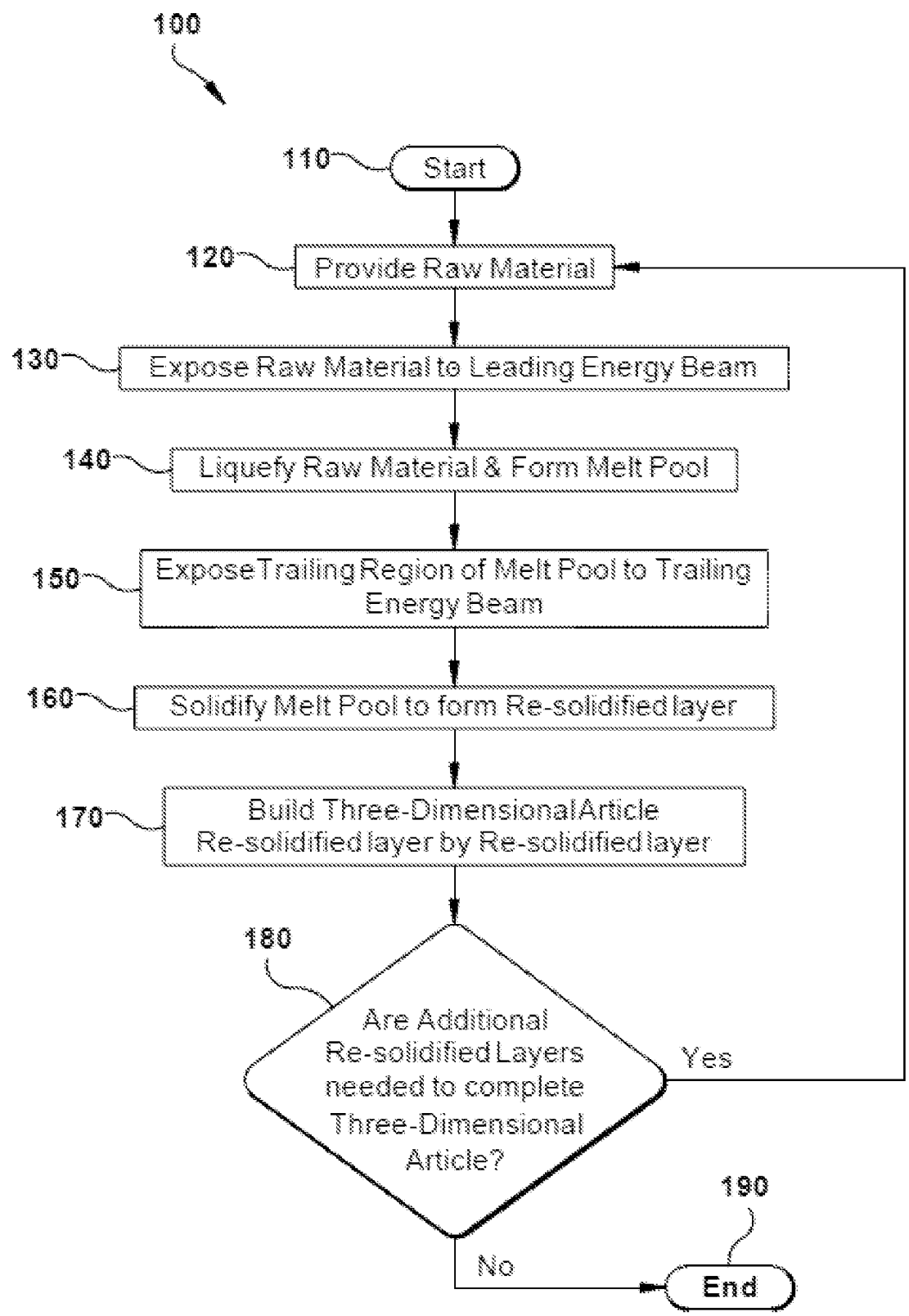
FIG. 4 is a flow chart illustrating an exemplary method of additive manufacturing according to an embodiment of the invention.

Turning to FIG. 4 (with reference to FIG. 3 and FIG. 5), a flow chart illustrating an exemplary method 100 of additively manufacturing a three-dimensional article is shown. The method 100 has similar features to the fusion processing method 1 described above, and consequently one or more features of the method 100 may be applicable to the method 1 (or vice versa), except as noted below. It is also understood that aspects of the methods 1, 100 may be substituted for one another or used in conjunction with one another where applicable.

The method 100 may begin before step 110 by configuring a model for the article and/or fabrication instructions for the article to be additively manufactured. The article model may be any computer-readable file or files on a non-transitory computer readable medium that collectively specify the structure, materials, and/or other features of the article. This may, for example include CAD files, STL files, and the like that provide three-dimensional descriptions of the article. Fabrication instructions corresponding to a model may be any collection of instructions that, when carried out by an additive manufacturing apparatus or three-dimensional printer, result in the fabrication of the article. For example, fabrication instructions may include a series of instructions for moving to various x,y,z coordinates and controlling power level, beam current, feed rate, travel speed, or other desired parameters. The process 100 may be carried out using suitable digital electronic circuitry, or computer software, firmware, or hardware, as understood by those having skill in the art. For example, during the molten pool deposition process, the material deposition system 10 may receive fabrication instructions from a controller (e.g., control system 20) according to the previously described model.

At step 120, the raw material 13 is provided in solid state form. As discussed above, the raw material 13 (shown in FIG. 3, for example) may be a metal or metal alloy, such as the exemplary aluminum alloy precursor material (e.g., Table 1), and may be in the form of a wire, which may be fed by the material delivery device 12 at a controlled feed rate to a feed region. It is understood, however, that the raw material may be different materials (e.g., different metals, metal alloys, or non-metals), and may be provided in different forms (e.g., fed via a dispenser as a powder spray, or provided as a powder bed), as would understood by those having ordinary skill in the art.

At step 130, the raw material 13 is exposed to the leading energy beam 16. As discussed above, the leading energy beam 16 may be an electron beam emitted from the electron gun 14, where the leading energy beam 16 has sufficient energy to heat the raw material 13 beyond its melting point. The leading energy beam 16 may be derived from the emitted energy beam 15 via rastering to form the leading energy beam pattern 16a, as discussed above. In the illustrated embodiment, the leading energy beam pattern 16a is a circular pattern, and more particularly may be composed of a series of concentric circles, as shown. There may be two or more concentric circles, such as 3, 6, 9, 12 or more such concentric circles. Other leading energy beam patterns are also possible, such as elliptical, parabolic, or polygonal patterns. So as to effectively transmit electrons to impinge upon the raw material 13, the chamber 28 may be under vacuum. It is understood that although the energy beam is an electron beam in the illustrated embodiment, other energy beams (also referred to as direct energy sources) are possible as would be understood by those having skill in the art. For example, other types of energy beams may include, but are not limited to, laser, electric arc, plasma, and the like.

Figure 5:
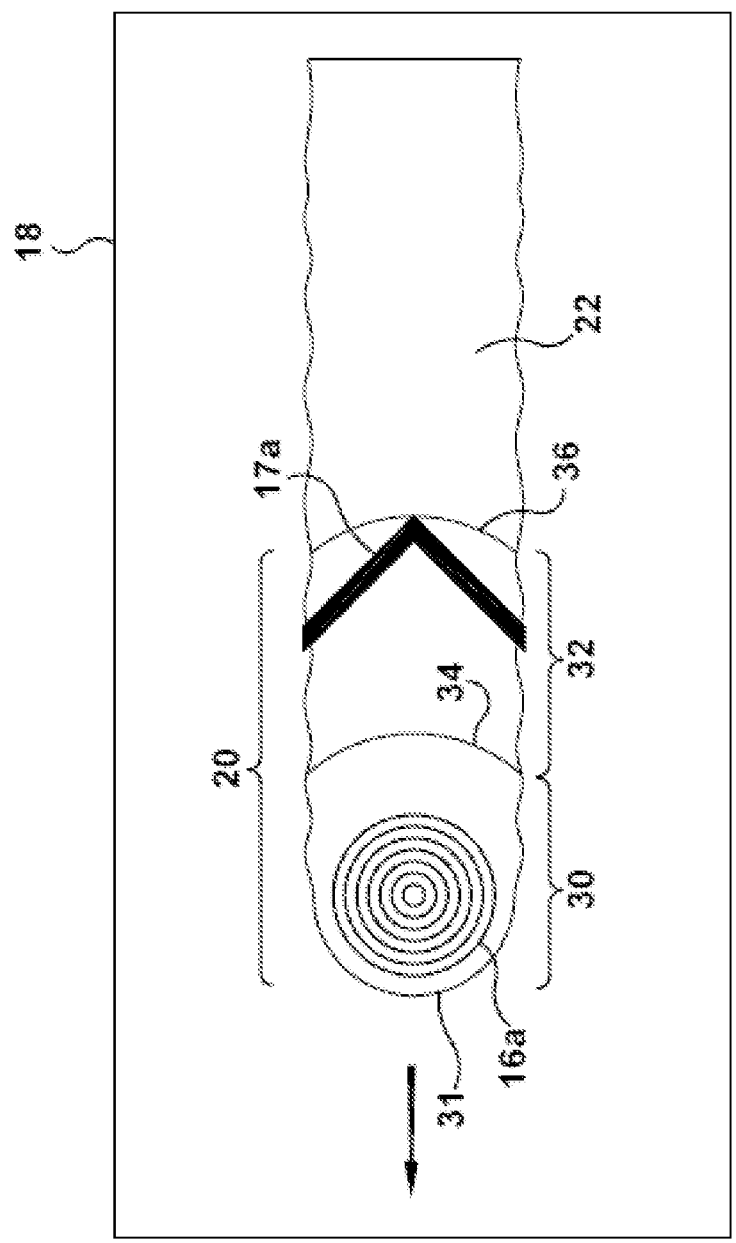
FIG. 5 is schematic plan view illustrating an exemplary process of additive manufacturing according to an embodiment of the invention.

At step 140, the raw material 13 is heated beyond its melting point to liquefy the raw material and form a melt pool 20. As shown in FIGS. 3 and 5, the melt pool 20 may be a molten pool deposit, which may be formed on a substrate. The melt pool 20 may be formed with the liquefied raw material as the leading energy beam 16 moves forward in a travel direction (shown with arrow) along an x-y plane relative to the substrate. As discussed above, the substrate upon which the melt pool is formed may include the work piece support 18 and/or a re-solidified layer 22, or other such substrate capable of receiving and supporting the melt pool 20. The process may be under inert conditions to reduce the formation of oxides in the melt pool. As discussed above, it is possible that instead of the electron gun 14 moving relative to the substrate, that the work piece support 18 may move relative to a fixed energy beam. Furthermore, the x-y plane may be an arbitrary frame of reference, and may include one or more planes other than horizontal. In addition, where other additive manufacturing methods other than EBAM are utilized, it is understood that the melt pool may be formed in a different manner or different location, for example, the melt pool may be formed in a powder bed, and may be carried out in an inert environment, such as by backfilling the chamber with an inert gas, for example, helium, argon, or other suitable gas that does not detrimentally react with the melt pool.

As illustrated in FIG. 5, the melt pool 20 includes a leading region 30 and a trailing region 32. As shown, the leading region 30 is proximal to the leading energy beam (e.g., leading energy beam pattern 16a), such as proximal to the region where the leading energy beam 16 impinges and liquefies the raw material 13. In this manner, the leading region 30 of the melt pool may represent the region where fresh liquid melt is deposited (e.g., the region where the raw material is fed), and thus moves with the leading energy beam 16 along the x-y plane. Because the leading region 30 is the region where fresh liquid melt is continuously deposited, the leading region 30, and particularly the forward edge 31 of region 30, may be at a temperature that is greater than the liquidus temperature of the raw material, and thus predominantly contains a liquid phase of the raw material.

As the forward edge of the leading region 30 continues to move forward in the travel direction, the trailing region 32 behind the leading region 30 begins to cool and solidify. In this manner, the melt pool 20 may be fully liquid at the leading region 30, may begin to re-solidify at a forward interface 34 of the trailing region 32, and solidification may progress through the trailing region 32 toward a rearward interface 36 of the trailing region 32 where the material may be completely re-solidified. In other words, the trailing region 32 may be considered to include a liquid phase interface (e.g., the forward interface 34 where the trailing region 32 interfaces with the leading region 30, and which may be representative of the liquidus isotherm of the raw material), a solid phase interface (e.g., the rearward interface 36 where the trailing region 32 interfaces with the re-solidified raw material 22, and which may be representative of the solidus isotherm of the raw material), and a transition region between the liquid phase interface 34 and the solid phase interface 36. The transition region between the liquid interface 34 and the solid interface 32 (which may be at a temperature between the liquidus and solidus temperatures) is the region where solidification and grain growth begins to occur in the melt pool 20, and thus contains a two-phase mixture of solid particulate and liquid metal (e.g., a solid-liquid phase).

During cooling in the transition region, a volumetric change occurs during the liquid-to-solid phase change of the raw material, such that shrinkage occurs in the cooler region of the trailing region 32 near the solid interface 36. Strain in the melt pool caused by such shrinkage may cause porosity or openings to develop in this cooler solidifying region, and if the available supply of liquid metal is insufficient or incapable of filling these openings between the solidifying metal, then hot cracking may occur. The issue of hot cracking may be exacerbated by the formation of dendritic structures in the transition region of the melt pool, which may form narrow channels between solidifying grains that act to choke off or prevent the liquid metal from replenishing the reduced volume caused by solidification shrinkage. For some metals or metal alloys, such as some aluminum alloys (e.g., Al 6061, or other 6xxx-series aluminum alloys), the problem of hot cracking has traditionally been difficult to address. In exemplary embodiments, the additive manufacturing process 100 may be utilized to reduce hot cracking of metals or alloys.

Referring back to FIG. 4 (with reference to FIGS. 3 and 5), at step 150, the trailing region 32 of the melt pool 20 is exposed to the trailing energy beam 17. For example, the trailing energy beam 17 may be directed toward the forward (liquid) interface 34 of the trailing region, the rearward (solid) interface 36 of the trailing region, and/or the transition region between the interfaces 34, 36. In exemplary embodiments, the trailing energy beam 17 is configured to reduce hot cracking as the melt pool 20 solidifies. More particularly, the trailing energy beam 17 may have a power level, power density, pulsation, beam pattern, and/or positional relationship sufficient to break-up or disrupt dendritic structures in the trailing region 32 of the melt pool. For example, the trailing energy beam 17 may be configured to re-heat or re-melt dendritic structures in the melt pool, which may reduce blockages in the melt pool that otherwise prevent liquid melt from replenishing the lost volume due to shrinkage. Alternatively or additionally, the trailing energy beam 17 may be configured to enhance agitation and/or redistribution of the liquid phase in the trailing region of the melt pool. For example, the trailing energy beam 17 may enhance convective currents and/or induce pulsing electromagnetic fields that may generate turbulence in the trailing region of the melt pool, which may reduce the formation of dendrites, allowing for a more equiaxed grain structure, and/or which may enhance liquid metal flow to the solidifying regions of the melt pool. Alternatively or additionally, the trailing energy beam 17 may be configured to stress relieve or anneal the re-solidified raw material behind the trailing edge of the melt pool.

In exemplary embodiments, the trailing energy beam 17 may have a power level or power density that is different than a power level or power density of the leading energy beam 16. Alternatively or additionally, the trailing energy beam 17 may have a trailing energy beam pattern 17a that is different than the leading energy beam pattern 16a defined by the leading energy beam 16. As discussed above, the difference in power level, power density, pulsation, beam pattern, and/or positional relationship between the trailing energy beam and leading energy beam may be provided by virtue of translating an energy beam, such as the emitted energy beam 15, through a raster pattern. It is understood, however, that other methods of providing a separate and distinct trailing energy beam 17 may be employed, such as by having two separate energy sources that emit respective leading and trailing energy beams, each of which may be rastered, defocused, or translated to form a desired pattern.

In exemplary embodiments, the trailing energy beam 17 may form a beam pattern that generally corresponds to the shape of the transition region (e.g., trailing region 32) of the melt pool 20. For example, as shown in FIG. 5, the transition region located between the liquid interface 34 and the solid interface 36 typically has a generally concave shape that opens toward the leading region 30, because the lateral edges of the melt pool 20 may cool faster than the center. Accordingly, in some exemplary embodiments, the trailing energy beam pattern 17a may be configured in a concave pattern with the concave side toward the leading region 30 of the melt pool (as shown in FIG. 5, for example), which may enhance the disruption of dendritic structures and/or promote redistribution of liquid melt. As shown, the apex of the concave pattern may be positioned at a centerline of the trailing region 32 in the travel direction. The trailing energy beam pattern 17a may have a lateral width that is at least as wide, or wider, than a lateral width of the trailing region 32, where the respective lateral widths are taken in a direction orthogonal to the travel direction. In the illustrated embodiment, the trailing energy beam pattern 17a is chevron-shaped, which is found to be effective in reducing hot cracking during the exemplary additive manufacturing process 100. In other embodiments, the trailing energy beam pattern 17a may be configured with an arc-shaped, crescent-shaped, or parabolic-shaped pattern, or other similar concave patterns, including polygonal patterns.

In exemplary embodiments, the trailing energy beam 17 (e.g., the trailing energy beam pattern 17a) may be spaced apart from the leading energy beam 16 (e.g., the leading energy beam pattern 16a) at a fixed distance as the respective energy beams move together in the travel direction. As shown in the illustrated embodiment of FIG. 5, the trailing energy beam pattern 17a may be spaced apart from the leading energy beam pattern 16a at a fixed distance such that the trailing energy beam 17 may be maintained in the transition region containing the solid-liquid phase (e.g., trailing region 32). It is understood that the terms "fixed distance" or "fixed position" when used to describe the positional relationship between the respective energy beams, or respective energy beam patterns, means that the energy beams themselves, or the patterns that are formed by the energy beams, are in such a positional relationship as they impinge the raw material, even though during rastering the emitted beam may move point-to-point to form such beams or such patterns, as understood from the discussion above. It is also understood that although in some embodiments the trailing energy beam pattern may be fixed relative to the leading energy beam pattern, that the position of the trailing energy beam 17 (e.g., trailing energy beam pattern 17a) may be varied relative to the leading energy beam 16 (e.g., leading energy beam pattern 16a) during the additive manufacturing process, as discussed in further detail below with reference to FIG. 6.

Referring again to the flow chart shown in FIG. 4 (with reference to FIGS. 3 and 5), at step 160, as the melt pool 20 sufficiently cools at the rearward edge of the trailing region 32, the solid interface 36 is formed, and the solidified melt pool forms the re-solidified layer 22, or trace, that trails the path taken by the leading energy beam 16, leading region 30, and trailing region 32 along the x-y plane. At step 170, these re-solidified layers 22 are deposited adjacent to each other along the x-y plane, and/or on top of each other along a z-axis that is orthogonal to the x-y plane, so as to build the three-dimensional article re-solidified layer by re-solidified layer. As such, at step 180, the process may repeat a number of times until the three-dimension article is formed to a desired level of completion.

In exemplary embodiments, one or more of the parameters of the exemplary process 100 may be optimized to reduce hot cracking. By way of example, and not limitation, one or more of the following parameters may be varied in an EBAM process for optimization: wire feed rate, total emitted beam power, and power distribution between the leading energy beam and the trailing energy beam. In this example, the wire feed rate is the rate at which the raw material wire is fed to the feed region; the total emitted beam power is the total power level of the emitted electron beam from the source, which is translated through a raster pattern to define the leading energy beam and the trailing energy beam; and the power distribution is the split of the total power level between the leading energy beam and the trailing energy beam. By way of example, and not limitation, one or more of the following parameters may be constant during optimization of the EBAM process: travel speed (e.g., relative speed between the EB gun and substrate), accelerating voltage of the electron beam, wire diameter, wire composition, size of the deposited specimens, and interpass temperature. By way of example, and not limitation, one or more of the following observations may be made: visual inspection of external segregation defects (e.g., macro-cracking), mechanical testing (e.g., tensile and hardness testing), radiographic inspection of internal segregation defects (e.g., internal porosity), and compositional analysis of the deposited and re-solidified raw material (e.g., spark emission spectroscopy).

In one example of an optimization experiment, the following constant parameters are used to additively manufacture test specimens: (i) the travel speed is about 15 inches per minute, (ii) the accelerating voltage is about 30 kV, (iii) the wire diameter is about 0.125 inches, (iv) the wire composition is aluminum 6061 alloy, (v) the vacuum level is less than about 100 microtorr (vi) the leading energy beam pattern is a series of nine concentric circles, (vii) the trailing energy beam pattern is chevron-shaped, (viii) the trailing energy beam pattern is directed at the trailing region of the melt pool, and is at a fixed distance relative to the leading energy beam pattern, (ix) the interpass temperature is less than about 30 degrees Celsius, and (x) the size of the deposited specimen is about 8 in.×0.75 in.×2 inch. It is noted that in this optimization experiment the aluminum 6061 alloy was used as the raw material, instead of the exemplary aluminum alloy precursor material described above (e.g., Table 1), in order to demonstrate the effects of altering the EBAM parameters. Based on visual and radiographic observations for segregation defects (e.g., cracking and porosity) and mechanical testing (e.g., tensile testing) of the specimens, the results of the optimization experiment indicate that one or more of following parameters may be optimal for electron beam additively manufacturing the aluminum 6061 alloy: (i) the total power level is in the range of about 1 kW to about 10 kW, more particularly in the range of about 2 kW to about 5 kW (with a beam current in the range of about 80 mA to about 143 mA, for example), (ii) the distribution of the total power level is split between the leading energy beam (L) and the trailing energy beam (T) by a ratio in the range of about 85:15 (L:T) to about 99:1 (L:T), and (iii) the wire feed rate is in the range of about 30 inches per minute to about 55 inches per minute. More particularly, the results of the optimization experiment indicate that the following parameters of the EBAM process create specimens that have the fewest cracks and porosity by visual and radiographic observation, and have the highest tensile strength results: (i) the total power level is in the range of about 2 kW to about 3 kW, more particularly about 2.7 kW, (ii) the distribution of the total power level is split between the leading energy beam (L) and the trailing energy beam (T) by a ratio of about 95:5 (L:T), and (iii) the wire feed rate is about 40 inches per minute.

Also based on the above-described optimization experiment, the results of compositional analysis (e.g., spark emission spectroscopy) of the fabricated specimens indicate that the weight percentage of magnesium and zinc are reduced during the EBAM process, which causes the fabricated articles to fall outside of the prescribed compositional specifications for Al 6061 alloy (e.g., Table 2), more particularly outside the prescribed limits for magnesium. As mentioned above, in the Al 6061 alloy, magnesium is an alloying agent that contributes to strength of the alloy, particularly during subsequent heat treatment. Zinc may be a tramp element found in the aluminum alloy (e.g., not added for performance), but its loss during the EBAM process may contribute to porosity of the solidified specimen, which may thus reduce strength. These alloying agents (e.g., Mg) or tramp elements (e.g., Zn) each have an intrinsic vapor pressure that varies with temperature. For example, during the EBAM process, the processing temperature of the Al 6061 alloy is beyond its melting point (so as to form the melt pool), which may be in the range of about 580 degrees Celsius (solidus) to about 652 degrees Celsius (liquidus). At this processing temperature, the vapor pressure of magnesium is typically greater than 100 microtorr (e.g., the vapor pressure of magnesium at 652 degrees Celsius is about 3.4 torr). However, the pressure level in the EBAM chamber during additive manufacturing is traditionally set to below 100 microtorr. Thus, during EBAM processing of the Al 6061 alloy, the elevated processing temperature (e.g., 580 degrees Celsius to about 652 degrees Celsius) in the low pressure environment (e.g., below 100 microtorr) may contribute to vaporization of elements in the aluminum 6061 alloy, such as magnesium and zinc.

In exemplary embodiments, the vacuum level used during an exemplary additive manufacturing process may be decreased compared to traditional EBAM processing parameters, bringing the pressure level closer to atmospheric pressure (but still below atmospheric pressure) so as to prevent or reduce vaporization of one or more alloying agents during the additive manufacturing process, which may thereby reduce hot cracking and/or reduce internal porosity in the additively manufactured article. For example, where the raw material is a metal alloy having one or more alloying agents that contribute to increasing strength of the metal alloy, then the vacuum chamber may be set to a pressure level during the additive manufacturing process that is closer to, equal to, or greater than the vapor pressure of the one or more alloying agents at the processing temperature to reduce vaporization thereof. It is understood, however, that some additive manufacturing processes may be limited to a maximum pressure level in the vacuum chamber based on limitations of the additive manufacturing process/apparatus. For example, during an EBAM process, increasing the pressure level to greater than 3,000 microtorr may affect electron beam characteristics (e.g., increased attenuation of the electron beam caused by a scattering effect of the atmosphere in the chamber), or may affect EB gun discharging (e.g., metal vapor or positive ions entering the EB gun and causing electric arcs that may lead to breakdown or interruption during the process). As such, although it would be advantageous to reach or exceed the vapor pressure of the alloying agent at the processing temperature (e.g., 3.4 torr for preventing vaporization of magnesium as discussed above), such elevated pressure levels may not be practical for some additive manufacturing apparatus (e.g., EBAM apparatus), but may be practical for other apparatus (e.g., laser-based additive manufacturing apparatus, for example). In any case, it may be beneficial to increase the pressure level in the vacuum chamber to about 500 microtorr or greater for reducing vaporization of alloying agents at the processing temperature, for example about 600, 700, 800, 900, 1000, 1250, 1500, 1750, 2000, 2250, 2500, 2750, 3000 microtorr, or more, including all ranges and subranges therebetween. Additionally, the vacuum chamber may be back-filled with an inert gas, such as helium By way of example, and not limitation, an experiment is conducted that increases the pressure level of the vacuum chamber (closer to atmospheric pressure) during an exemplary EBAM process when compared to a traditional EBAM process that uses a chamber pressure of less than 100 microtorr. In the example, the exemplary EBAM process is used to fabricate Al 6061 (having at least Mg as an alloying agent), and the processing temperature of the raw material is in the range of about 580 degrees Celsius to about 652 degrees Celsius. In the example, the pressure level of the chamber is set to about 500 microtorr or greater. More particularly, so as to reduce the likelihood of discharging of the EB gun, the pressure level in the vacuum chamber is in the range of about 500 microtorr to about 3,000 microtorr. More particularly, so as to further reduce vaporization of the alloying agent(s), the pressure level in the vacuum chamber is in the range of about 1,000 microtorr to about 3,000 microtorr, or more particularly in the range of about 2,000 microtorr to about 3,000 microtorr. Additionally, the vacuum chamber is back-filled with helium. The results of this experiment indicate that such an exemplary process is effective to reduce vaporization of alloying agents, such as magnesium, which reduces porosity and improves compositional control of the additively manufactured specimens.

As discussed above with reference to FIG. 5, in some embodiments the trailing energy beam 17 (e.g., trailing energy beam pattern 17a) may be fixed relative to the leading energy beam 16 (e.g., leading energy beam pattern 16a); however, it is understood that in other exemplary embodiments it may be advantageous for the trailing energy beam 17 (e.g., the trailing energy beam pattern 17a) to instead be dynamically adjusted during the additive manufacturing process 100. Such dynamic adjustment of the trailing energy beam 17 may enhance agitation of the melt pool 20 at the trailing region 32 by promoting convective currents or turbulence from pulsing electromagnetic fields in the melt pool which may provide a stirring effect. Such a process may disrupt dendritic structures and encourage a more equiaxed grain structure in the trailing region 32, and/or may enhance redistribution of liquid melt from the leading region 30 toward the trailing region 32 so as to replenish lost volume caused by shrinkage as the melt pool solidifies. This may reduce hot cracking, reduce internal porosity, and/or improve strength and ductility in the additively manufactured article.

In exemplary embodiments, the trailing energy beam 17 (e.g., the trailing energy beam pattern 17a) may be dynamically altered by varying the distance from the leading energy beam 16 (e.g., the leading energy beam pattern 16a) as the leading energy beam moves in the travel direction. For example, the trailing energy beam 17 may move back and forth in the melt pool 20 between a first position (e.g., that is closer to the leading energy beam 16, such as at or near the region of the liquid interface 34) and a second position (e.g., that is further from the leading energy beam 16, such as at or near the region of the solid interface 36); and/or may move to one or more intermediate positions between the first position and the second position. Alternatively or additionally, the trailing energy beam 17 may cycle between two or more positions located at varying distances from the leading energy beam 16. Alternatively or additionally, the trailing energy beam 17 may move in various other directions, such as side-to-side (e.g., laterally in a direction orthogonal to the travel direction), or may rock back and forth about a pivot point, for example. Such dynamic movement(s) of the trailing energy beam 17 may locally heat different regions of the melt pool causing density gradients that may promote convective or turbulent stirring, and/or which may enhance agitation by pulsing electromagnetic fields at the different regions. In exemplary embodiments, the trailing energy beam may alternate between several positions in such a way to promote movement of liquid melt in the direction opposite the general travel direction so as to encourage movement of fresh melt toward the solidifying regions of the melt pool (e.g., toward the rearward (solid) interface 36) in order to replenish material as shrinkage and contractions occur.

Figure 6:
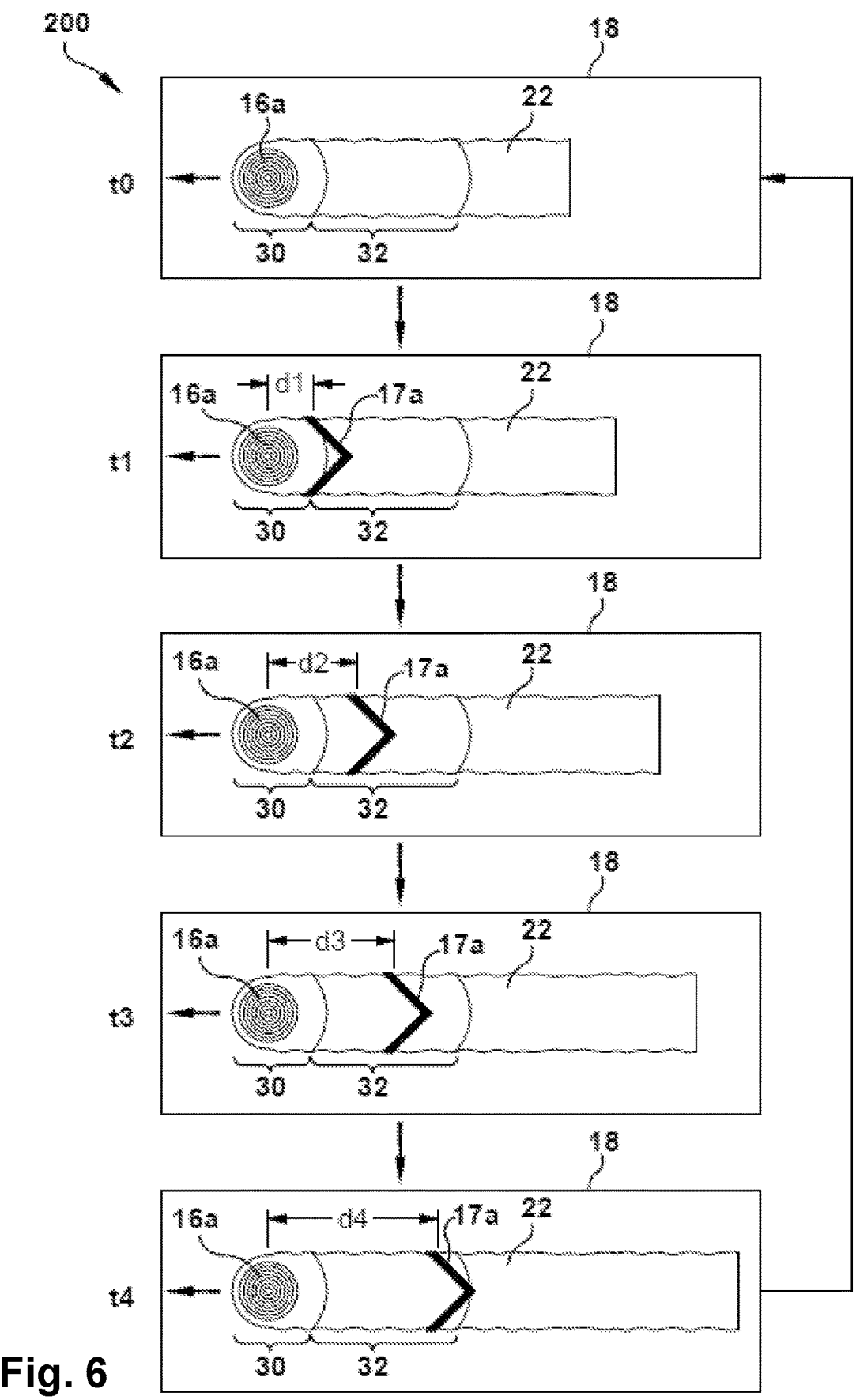
FIG. 6 in a schematic plan view illustrating another exemplary process of additive manufacturing according to an embodiment of the invention.

FIG. 6 illustrates an exemplary method 200 of dynamically altering the position of the trailing energy beam 17 (e.g., the trailing energy beam pattern 17a) relative to the leading energy beam 16 (e.g., the leading energy beam pattern 16a) during a manufacturing process. It is understood that this method 200 may be incorporated into the method 100 described above, such as at step 150. As shown in FIG. 6, the trailing energy beam pattern 17a may be spaced from the leading energy beam pattern 16a at progressively increasing distances (d1-d4) for each time interval (t1-t4), and then may cycle back through each interval. In this example, the general direction of each progressively increasing distance is from the leading region 30 toward the trailing region 32, which may encourage the liquid melt in the leading region 30 to move rearward toward the solidifying portions of the trailing region 32 (e.g., toward the rearward (solid) interface 36 of the trailing region). The trailing energy beam 17a may dwell for a period of time at each interval (t1-t4) so as to produce a density gradient in the melt pool that may enhance movement and inertia of the liquid metal, which may promote stirring and/or encourage liquid metal to redistribute toward the solidifying regions. Optionally, the trailing energy beam pattern 17a may be deactivated at one or more of the time intervals, such that only the leading energy beam pattern 16a is utilized. It is understood that at each time interval shown, the leading energy beam 16a and subsequent formation of the melt pool moves along the substrate 18 in the travel direction (shown with arrows), such that the re-solidified layer increases in size at each time interval (as shown).

By way of example, and not limitation, an experiment is conducted that utilizes the method 200 for electron beam additive manufacturing of aluminum alloy 6061. In the example, an electron beam gun emits an electron beam, which is translated through a raster pattern to form the leading energy beam pattern 16a and the trailing energy beam pattern 17a. In the example, the electron beam gun scans at a rate of 400 Hz, and the series of patterns (t0-t4) is repeated every 100 cycles. At t0 (scans 1-20), the trailing energy beam pattern 17a is deactivated and only the leading energy beam pattern is utilized. At t1 (scans 21-40), the trailing energy beam pattern 17a is spaced by a first distance d1, which is one-fourth of a maximum distance as represented by second distance d4 (shown at t4). It is understood that the maximum distance as used herein is not necessarily a maximum possible distance, but is an arbitrary designation of the maximum amount the beams are spaced apart during this process. At t2 (scans 41-60), the trailing energy beam pattern 17a is spaced by a first intermediate distance d2 between d1 and d4, where the distance d2 is at half of the maximum distance d4. At t3, (scans 61-80), the trailing energy beam pattern 17a is spaced by a second intermediate distance d3, which is at three-fourth of the maximum distance d4. At t4 (scans 81-100), the trailing energy beam pattern 17a is spaced at the maximum distance d4. This process then repeats for the desired number of cycles as the layer 22 is formed. The results of this experiment indicate that the process 200 is effective to further reduce porosity, further increase strength (e.g., ultimate tensile strength), and further increase ductility of the additively manufactured specimen when compared to a similar EBAM process that uses the trailing energy beam at a fixed distance as discussed above. The results also indicate that such a dynamic trailing energy beam may be effective to reduce volatilization of alloying agents, such as magnesium, which may be due to the stirring effect.

It is understood in the foregoing discussion that the term "varying distances" or "varying positions," or such similar terms used to describe positional relationships between the respective energy beams, or respective energy beam patterns, means that the energy beams themselves, or the patterns that are formed by the energy beams, are in such positional relationships as they impinge the raw material, understanding that during a rastering method the emitted beam may already be moving point-to-point to form such beams or such patterns. It is further understood that the advantages provided by the dynamic alteration(s) of the trailing energy beam as discussed above are not limited to the trailing energy beam being configured in a concave pattern as shown, but rather it is contemplated that advantages may be realized using various other trailing energy beam patterns, such as circular, concentric circles, elliptical, polygonal, etc. It is also understood that varying the position of the trailing energy beam may be one of many different ways to dynamically alter the trailing energy beam to enhance agitation/redistribution in the melt pool, and other such methods of dynamic alteration may include one or more of: varying the intensity of the trailing energy beam (e.g., the energy level or power density), varying the pattern of the trailing energy beam, and other similar dynamic variations.

Figure 7:
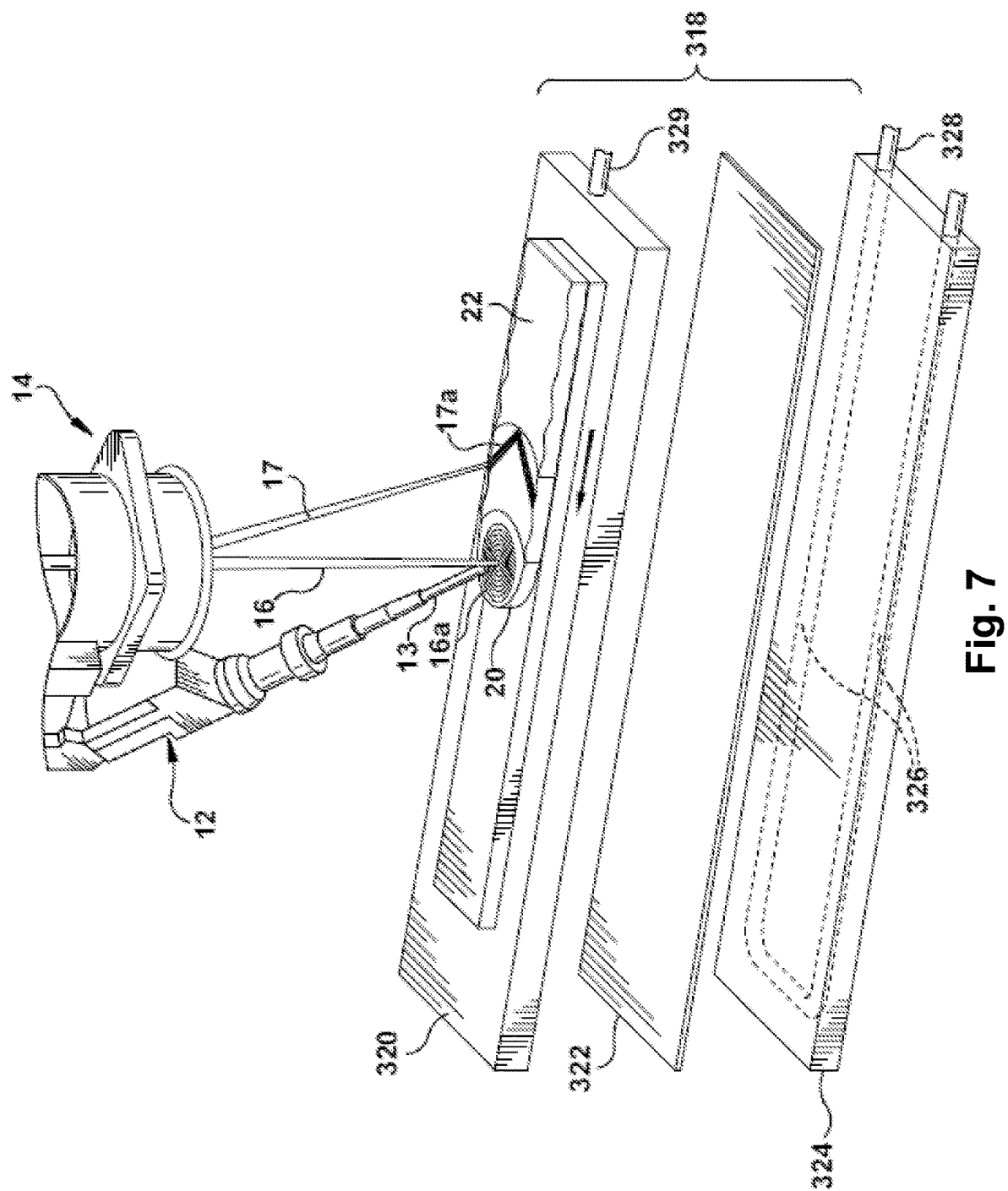
FIG. 7 is an enlarged schematic view of an exemplary work piece support with chill plate according to an embodiment of the invention, which may be utilized in the additive manufacturing apparatus in FIG. 1.

Turning to FIG. 7, another exemplary embodiment of a work piece support 318 for the exemplary EBAM apparatus 10 is shown. The work piece support 318 is substantially similar to the above-referenced work piece support 18, and consequently the foregoing description of the work piece support 18 is equally applicable to the work piece support 318, except as noted below.

The work piece support 318 may form a substrate for supporting the liquefied raw material as a molten pool deposit 20, either directly or indirectly via the one or more re-solidified layers 22. In this manner, the substrate formed by the work piece support 318 provides a heat transfer medium for extracting heat from the molten pool deposit 20, or from the re-solidified layers 22, or both. Because the EBAM process typically occurs under vacuum, there is no convective heat transfer available to cool the melt pool 20, re-solidified layers 22, or substrate (e.g., substrate support 320), and thus heat may uncontrollably accumulate in the substrate. This accumulation of heat in the substrate may affect the interpass temperature, which is the temperature of the substrate in the feed region just before a subsequent molten pool deposit is made. The interpass temperature may affect the characteristics of the molten pool deposit 20 and/or the re-solidified layer 22, and thus it may be advantageous to control the interpass temperature.

As shown in the illustrated embodiment, the work piece support 318 includes a chill plate 324, which is operatively coupled in thermal communication with the substrate support 320. A compressible thermally conductive material 322 may be interposed between the chill plate 324 and the substrate support 320. The thermally conductive material 322 may be Grafoil (self-adhering graphite particles) manufactured by Graftech International of Parma, Ohio. The compressible thermally conductive material (e.g., Grafoil) may minimize gaps between the substrate support 320 and the chill plate 314, for example, to less than 25 microns so as to enhance conductive heat transfer between the components. As shown, the chill plate 324 may include fluid passages 326, which may be fluidly coupled via fluid conduits 328 to a source of chilled fluid, such as water, for actively and continuously cooling the chill plate 324 as the chill plate extracts heat from the substrate support 320. One or more sensors 329, such as a thermocouple, may be embedded in one or more of the regions of the work piece support 318 to monitor temperature, and the active cooling of the chill plate 324 may be controlled, such as by the control system 20, in response to the measured temperature. In this manner, the chill plate 324 may be configured to maintain a relatively constant interpass temperature of the substrate during the EBAM process, such as at about 200, 100, or 65 degrees Celsius or less, for example.

Generally, the exemplary fusion processing method(s) (e.g., 1, 100, 200) described hereinabove may be used to form an article, such as a welded or three-dimensional article, preferably made from a metal or metal alloy, such as aluminum 6061 alloy. The article may be an aircraft component, a rocket component, a marine component, a spacecraft component, an automotive vehicle component, a turbine component, a radar component, or component capable of functioning in any similar application. The exemplary process may enable near net shape of parts at least as large as 4 ft.×4 ft.×19 ft., or larger. The exemplary process may reduce machining time, may decrease turnaround time, may enable larger structures to be made into smaller modular structures, may reduce costs, and may produce parts that are fully-annealed through the e.g., EBAM process, which may be less susceptible to warpage after the process. For example, in a case study for an airborne mine neutralization system (AMNS) by Raytheon Company. that uses an Al 6061 structure that is about 10 feet in length, the exemplary additive manufacturing process described above may realize a 57% cost savings in machining compared to conventional forming of the AMNS, may provide a 97% reduction in material removed, and may realize a 62% savings in machining time.

Embodiments of the inventive composition(s) and method(s) are illustrated in the following examples. These examples (and the foregoing examples) are provided for illustrative purpose and are not considered limitations on the scope of inventive compositions and methods.

EXAMPLES

Experimental Parameters

A series of test specimens are prepared by electron beam additive manufacturing in accordance with the method(s) (e.g., 100, 200) described above. The following constant parameters are used to additively manufacture the test specimens: (i) the travel speed is about 15 inches per minute, (ii) the accelerating voltage is about 30 kV, (iii) the total power level is in the range of about 1.5 kW to about 3 kW, (iv) the distribution of the total power level is split between the leading energy beam (L) and the trailing energy beam (T) by a ratio of about 95:5 (L:T), (v) the wire feed rate is about 40 inches per minute (vi) the wire diameter is about 0.125 inches, (vii) the leading energy beam pattern is a series of nine concentric circles, (viii) the trailing energy beam pattern is chevron-shaped, (ix) the interpass temperature as measured at the substrate plate is less than about 28 degrees Celsius, and (x) the size of the deposited specimen is about 8 in.×0.75 in.×2 inch.

The various test specimens are prepared by altering parameters of the EBAM process according to Table 3.

TABLE 3

Experimental Variables of Test Specimens

| Test Specimen | Wire Composition (Mg) | Chamber Pressure | Trailing Beam Configuration |
|---|---|---|---|
| 4-1 | 1 | <100 µTorr | Static |
| 4-2 | 1 | <100 µTorr | Dynamic |
| 4-3 | 1 | >2000 µTorr | Static |
| 4-4 | 1 | >2000 µTorr | Dynamic |
| 4-5 | 2 | <100 µTorr | Static |
| 4-6 | 2 | <100 µTorr | Dynamic |
| 4-7 | 2 | >2000 µTorr | Static |
| 4-8 | 2 | >2000 µTorr | Dynamic |
| 4-9 | 3 | <100 µTorr | Static |
| 4-10 | 3 | <100 µTorr | Dynamic |
| 4-11 | 3 | >2000 µTorr | Static |
| 4-12 | 3 | >2000 µTorr | Dynamic |

As shown in Table 3, twelve test specimens are prepared using the EBAM process. In accordance with one variable, the composition of the aluminum alloy precursor material is varied. More particularly, the precursor material for preparing each specimen is formed as an aluminum alloy in wire form having a composition according to Table 1, except that the magnesium content of some specimens is varied to have about 1 wt. %, about 2 wt. %, or about 3 wt. % of magnesium present in the alloy as indicated in Table 3. To accommodate for this change in magnesium content for each precursor aluminum alloy, the balance of aluminum in each precursor aluminum alloy is modified accordingly (e.g., 1 wt. %, 2 wt. %, or 3 wt. % less aluminum, respectively), with the other elements for each precursor alloy being within the ranges specified in Table 1.

In accordance with another variable shown in Table 3, the pressure level of the EBAM chamber is varied. More particularly, during the additive manufacturing of some specimens, the pressure level is set to about 100 microtorr or less, and for other specimens the pressure level is set to about 2,000 microtorr or more with the chamber back-filled with helium.

In accordance with another variable shown in Table 3, the configuration of the trailing energy beam is varied. More particularly, during the additive manufacturing of some specimens, the trailing energy beam is directed toward the trailing region of the melt pool and is fixed (e.g., static) relative to the leading energy beam in accordance with the method 100 described in reference to FIGS. 4 and 5 above. On the other hand, during the additive manufacturing of other specimens, the trailing energy beam is dynamically adjusted (e.g., dynamic) by varying the distance from the leading energy beam in accordance with the method 200 described in reference to FIG. 6 above. More particularly, for these specimens in which the trailing energy beam is dynamically altered, the electron beam gun scans at a rate of 400 Hz, and the series of patterns (t0-t4) is repeated every 100 cycles. At t0 (scans 1-20), the trailing energy beam pattern is deactivated and only the leading energy beam pattern is utilized. At t1 (scans 21-40), the trailing energy beam pattern 17*a* is spaced by a first distance d1, which is one-fourth of a maximum distance as represented by second distance d4 (shown at t4). At t2 (scans 41-60), the trailing energy beam pattern 17*a* is spaced by a first intermediate distance d2 between d1 and d4, where the distance d2 is at half of the maximum distance d4. At t3, (scans 61-80), the trailing energy beam pattern 17*a* is spaced by a second intermediate distance d3, which is at three-fourth of the maximum distance d4. At t4 (scans 81-100), the trailing energy beam pattern 17*a* is spaced at the maximum distance d4. This process then repeats for the desired number of cycles as the layer 22 is formed.

Following the additive manufacturing, each test specimen as deposited was stress relieved at 177 degrees Celsius for 4 hours, then machined into testing samples, and then heat treated by solution annealing at 529 degrees Celsius for 1 to 3 hours, water quenching, and artificially aging at 177 degrees Celsius for 8 to 10 hours per the specifications of SAE AMS 2770 for Al 6061 alloy with T6 heat treatment (incorporated by reference). Following heat treatment, each test specimen is then examined and tested as discussed in further detail below.

Visual and Radiographic Inspection:

Each test specimen is subjected to visual inspection for determination of crack count, and radiographic examination for determination of pore count. The results of these examinations are found in Table 4. The averages from the results in Table 4 for each varied parameter is summarized in FIGS. 8-10.

TABLE 4

Radiographic Inspection Results of Test Specimens

| Test Specimen | Pore Count |
|---|---|
| 4-1 | 100 |
| 4-2 | 0 |
| 4-3 | 100 |
| 4-4 | 0 |
| 4-5 | 100 |
| 4-6 | 0 |
| 4-7 | 80 |
| 4-8 | 0 |
| 4-9 | 40 |
| 4-10 | 30 |
| 4-11 | 2 |
| 4-12 | 1 |

Figure 8:
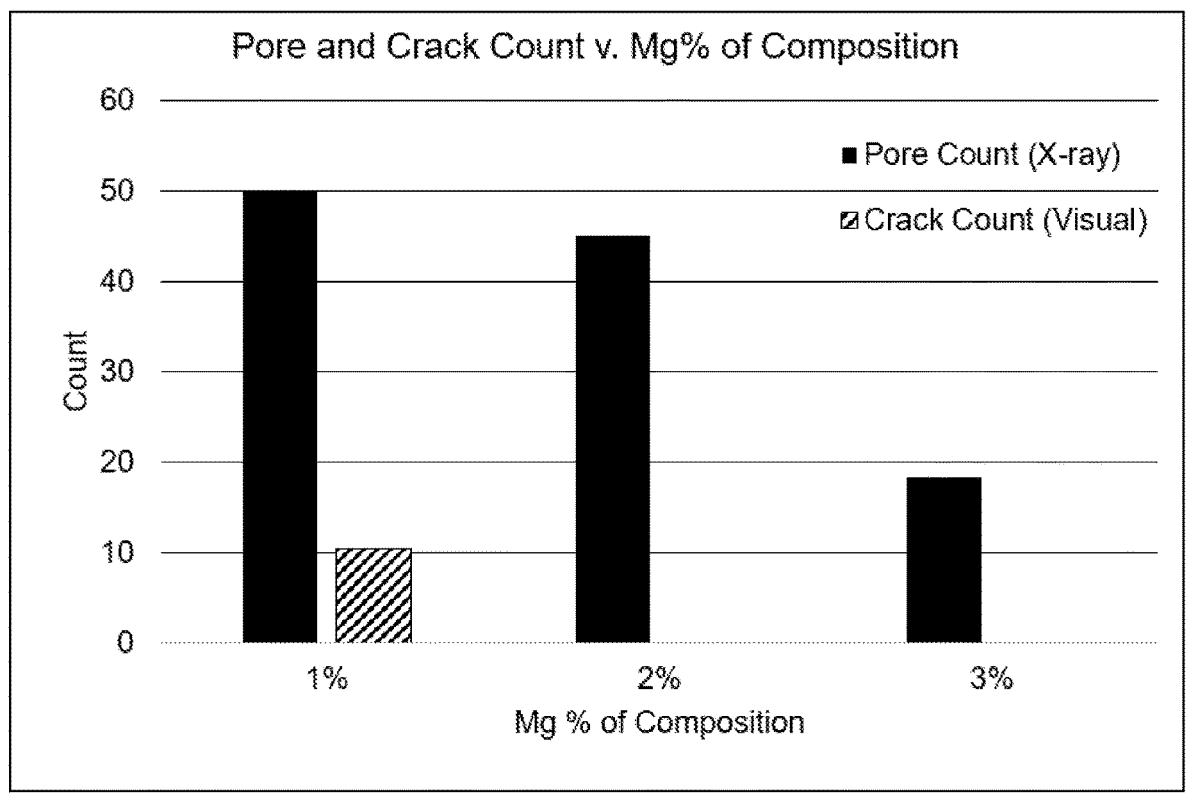
FIG. 8 illustrates experimental test results of crack and pore count versus magnesium content in exemplary aluminum alloys according to embodiments of the invention.

FIG. 8 shows the results of the crack and pore count determination versus magnesium content. The results indicate that those samples with a higher magnesium content (e.g., higher weight percent in the precursor alloy) exhibit fewer cracks and pores. This is believed to be due to the loss of magnesium during the high-energy, in vacuum, additive manufacturing process leading to vaporization of the magnesium, where those samples with enriched magnesium content were able to accommodate for this loss and exhibited fewer pores.

Figure 9:
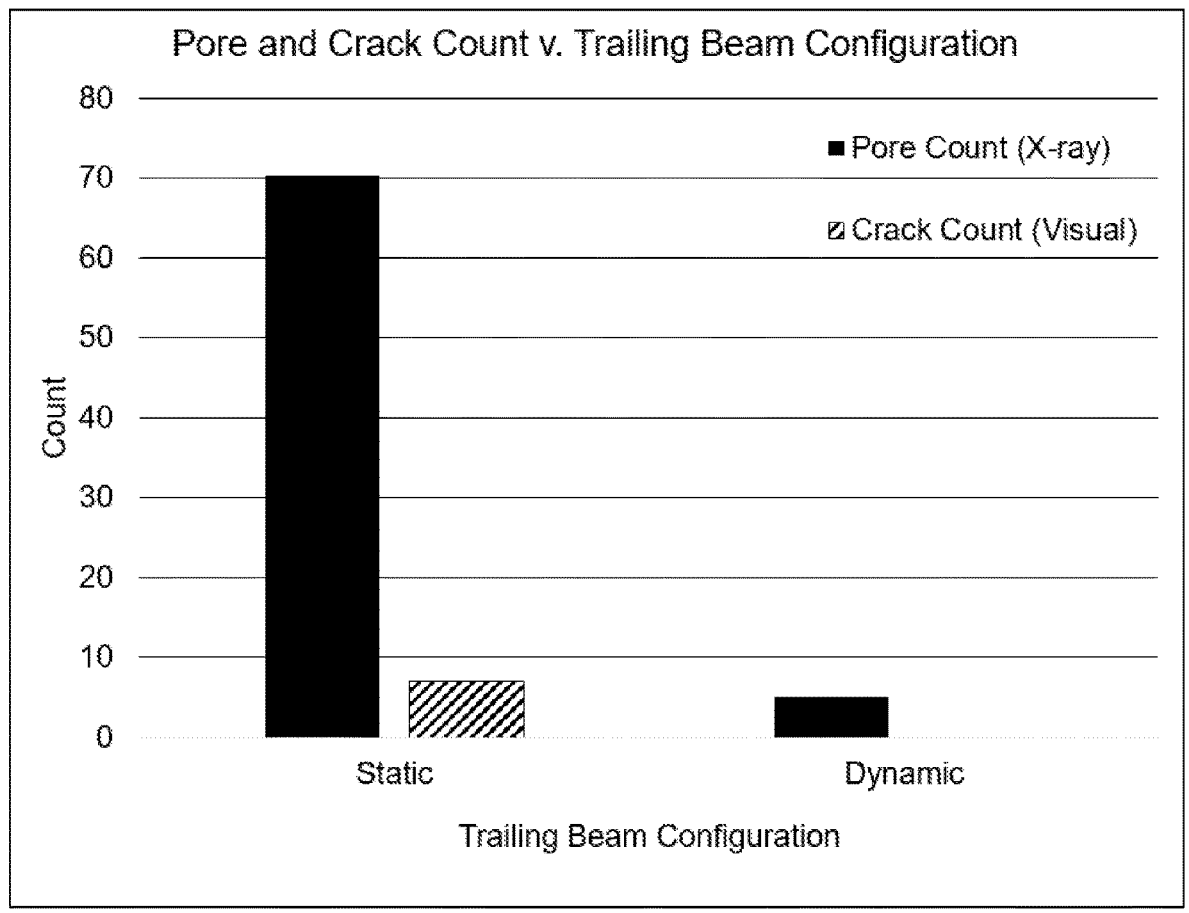
FIG. 9 illustrates experimental test results of crack and pore count versus trailing energy beam configuration for exemplary fusion processes according to embodiments of the invention.

FIG. 9 shows the results of the crack and pore count determination versus trailing energy beam configuration. The results indicate that those samples additively manufactured with a dynamic trailing energy beam exhibit fewer cracks and pores than those samples additively manufactured with a static trailing energy beam. It is believed that the dynamic trailing energy beam promotes stirring via convective currents and/or electromagnetic forces, which enhances replenishment of liquid melt to the solidifying regions and/or restricts loss of high vapor pressure constituents, thereby reducing cracks and pores.

Figure 10:
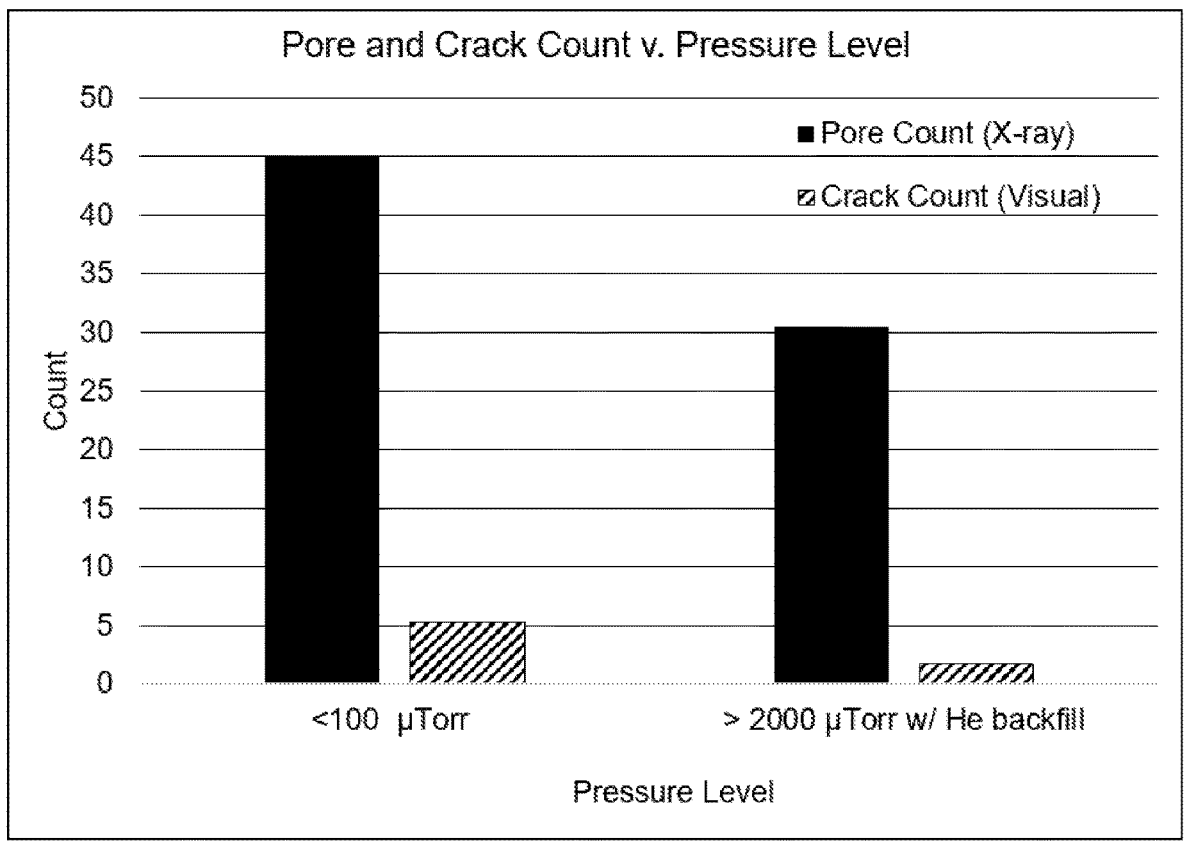
FIG. 10 illustrates experimental test results of crack and pore count determination versus chamber pressure level for exemplary fusion processes according to embodiments of the invention.

FIG. 10 shows the results of the crack and pore count determination versus EBAM chamber pressure level. The results indicate that those samples additively manufactured with a pressure level of 2,000 microtorr or greater exhibit fewer cracks and pores than those samples additively manufactured with a pressure level of 100 microtorr or less. It is believed that the lower chamber pressures results in an increased amount of the high vapor pressure constituents (e.g., magnesium and zinc) being lost during the additive manufacturing process, which increases porosity.

Mechanical Testing:

Each test specimen is machined into tensile test coupons and tensile tested for determination of yield strength, ultimate tensile strength, and elongation. The results of these tests are found in Table 5. The averages from the results in Table 5 for each varied parameter is summarized in FIGS. 11 and 12.

TABLE 5

Tensile Test Results of Test Specimens

| Test Specimen | Width (In) | Thickness (In) | Max Load (lbf) | Max Tensile Stress (ksi) | Tensile Stress at Yield (offset - 0.2%) (ksi) | Tensile Strain at Maximum Extension (%) | Break Zone |
|---|---|---|---|---|---|---|---|
| 4-1 | 0.5 | 0.361 | 3328 | 18.4 | 18.4 | 2.8 | Gage Length |
| 4-2 | 0.5 | 0.354 | 8243.9 | 46.6 | 43.8 | 14.2 | Gage Length |
| 4-3 | 0.501 | 0.405 | 5304.3 | 26.1 | 25.6 | 4.2 | Gage Length |
| 4-4 | 0.5 | 0.37 | 8792.2 | 47.5 | 43.8 | 13.4 | Gage Length |
| 4-5 | 0.503 | 0.413 | 8936.8 | 43 | 41.7 | 3.2 | Outside Gage Length |
| 4-6 | 0.501 | 0.382 | 9131.1 | 47.7 | 42.3 | 22.5 | Gage Length |
| 4-7 | 0.501 | 0.398 | 8771.8 | 44 | 42 | 3.6 | Gage Length |
| 4-8 | 0.5 | 0.368 | 8802.9 | 47.8 | 42.7 | 24.5 | Gage Length |
| 4-9 | 0.501 | 0.386 | 8723.6 | 45.1 | 40.9 | 12.7 | Gage Length |
| 4-10 | 0.5 | 0.349 | 8349.3 | 47.8 | 40.9 | 22.7 | Outside Gage Length |

TABLE 5-continued

Tensile Test Results of Test Specimens

| Test Specimen | Width (In) | Thickness (In) | Max Load (lbf) | Max Tensile Stress (ksi) | Tensile Stress at Yield (offset - 0.2%) (ksi) | Tensile Strain at Maximum Extension (%) | Break Zone |
|---|---|---|---|---|---|---|---|
| 4-11 | 0.5 | 0.36 | 8071.9 | 44.8 | 40.7 | 12.9 | Outside Gage Length |
| 4-12 | 0.501 | 0.367 | 8458.9 | 46 | 38.7 | 23.9 | Gage Length |

Figure 11:
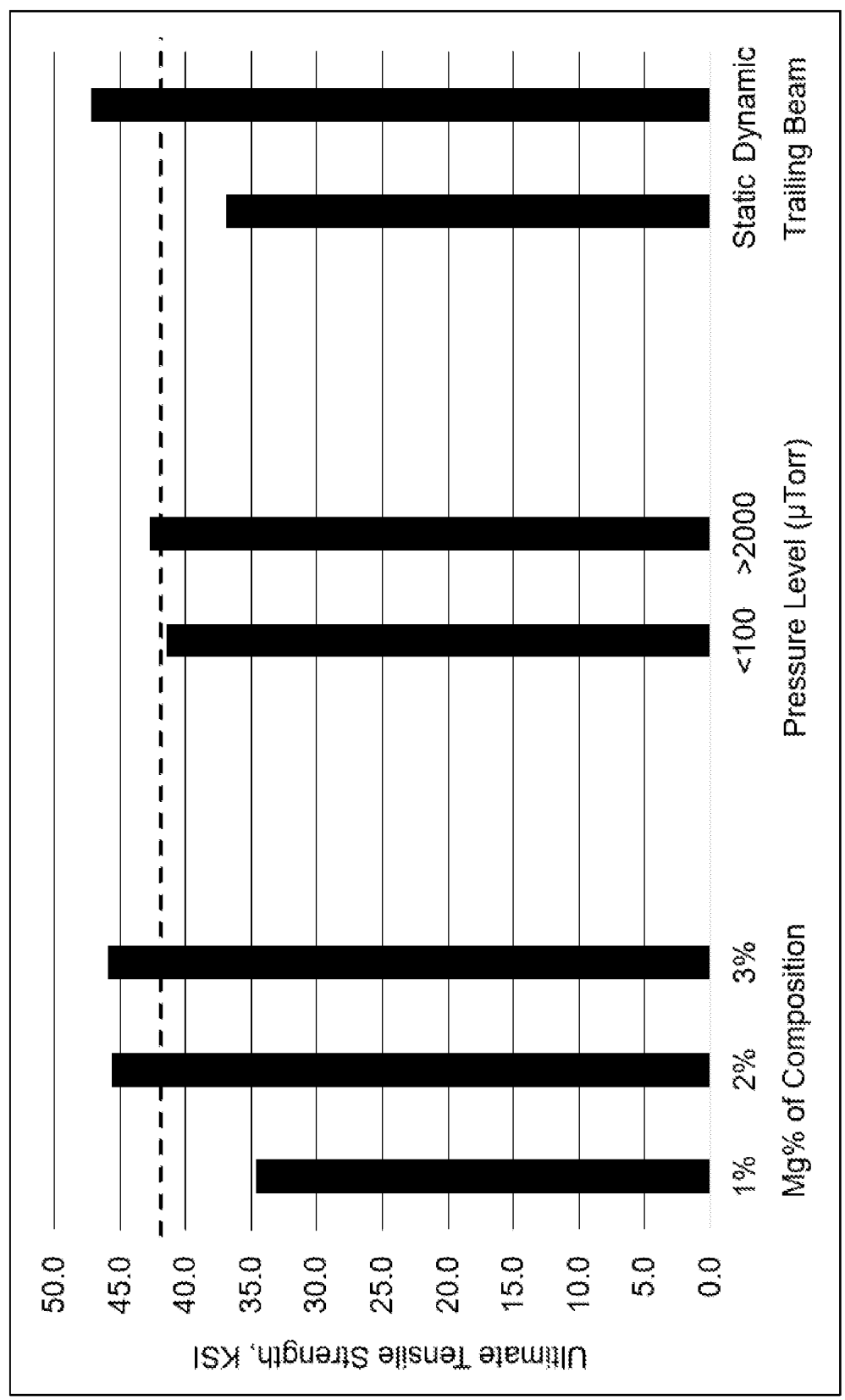
FIG. 11 illustrates experimental test results of ultimate tensile strength versus the variables of magnesium content, chamber pressure, and trailing energy beam configuration according to embodiments of the invention.

FIG. 11 shows the results of ultimate tensile strength versus the variables of magnesium content, chamber pressure, and trailing energy beam configuration. In FIG. 11, the threshold level indicated at 42.0 ksi is considered a minimum strength requirement in accordance with ASTM B209. The results in FIG. 11 indicate that those samples with a higher magnesium content (e.g., higher weight percent in the precursor alloy) exhibit increased ultimate tensile strength. As discussed above, magnesium is an alloying element that contributes to strength, particularly after subsequent heat treatment of 6000-series aluminum alloys. It is also understood that samples with higher magnesium and less porosity content exhibit higher strength. FIG. 11 also illustrates that the trailing beam configuration has a strong influence on strength, and those samples additively manufactured with a dynamic trailing energy beam exhibited greater strength than those samples additively manufactured with a static trailing energy beam. It is believed that the enhanced stirring effects provided by the dynamic trailing energy beam results in this increased strength. As shown, FIG. 11 also shows an increase in strength for those samples additively manufactured with a pressure level of 2,000 microtorr or greater exhibit compared to those samples additively manufactured with a pressure level of 100 microtorr or less.

Figure 12:
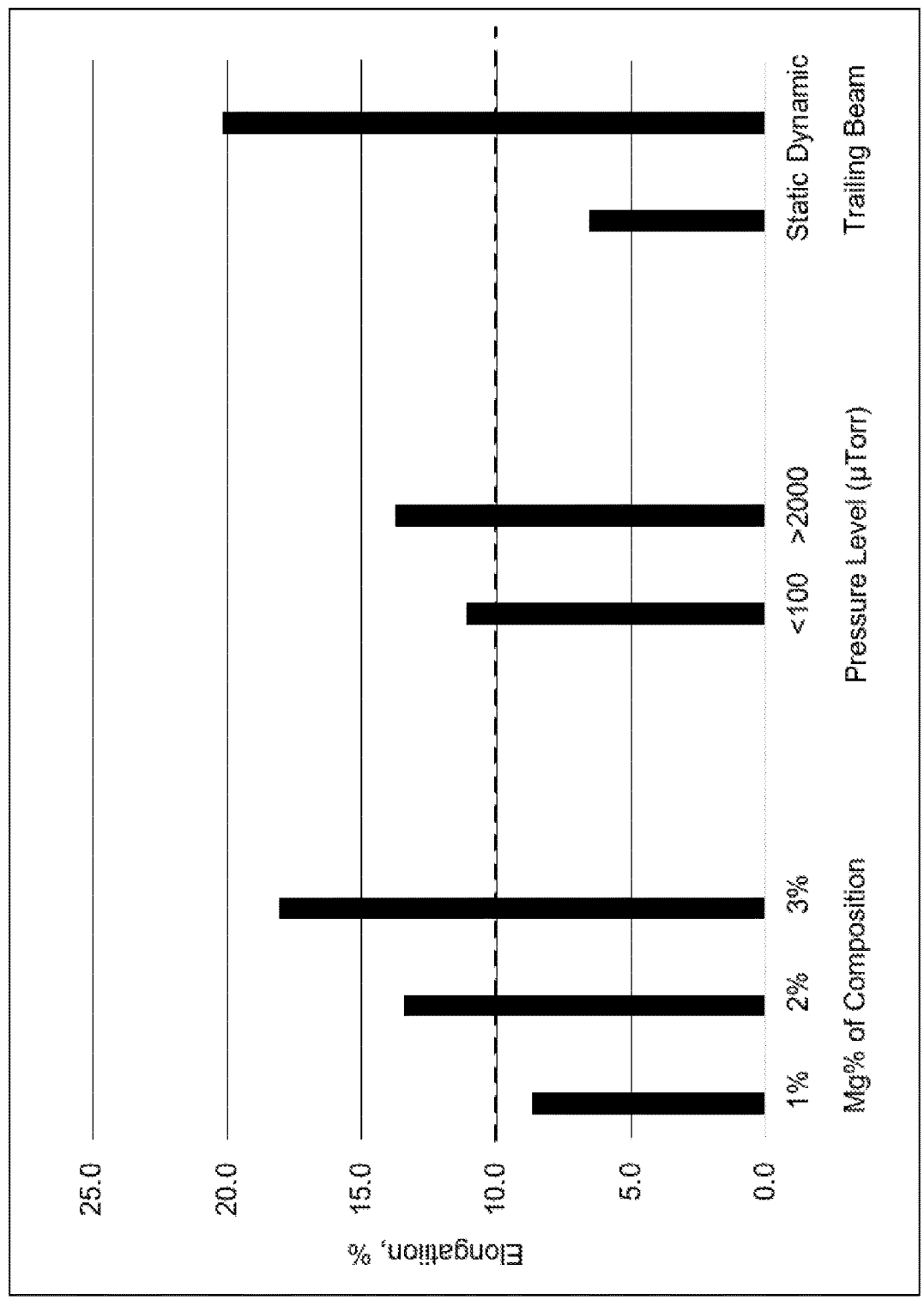
FIG. 12 illustrates experimental test results of elongation versus the variables of magnesium content, chamber pressure, and trailing energy beam configuration according to embodiments of the invention.

FIG. 12 shows the results of elongation versus the variables of magnesium content, chamber pressure, and trailing energy beam configuration. In FIG. 12, the threshold level indicated at 10% elongation is considered a minimum elongation requirement in accordance with ASTM B209 (e.g., in the thickness range of 0.250-0.499 in.). The results in FIG. 12 indicate that those samples with a higher magnesium content (e.g., higher weight percent in the precursor alloy) exhibit increased elongation. FIG. 12 also illustrates that the trailing beam configuration has a strong influence on elongation, and those samples additively manufactured with a dynamic trailing energy beam exhibited greater elongation than those samples additively manufactured with a static trailing energy beam. As shown, FIG. 12 also shows an increase in elongation for those samples additively manufactured with a pressure level of 2,000 microtorr or greater exhibit compared to those samples additively manufactured with a pressure level of 100 microtorr or less.

Compositional Analysis:

Each test specimen is tested via spark emission spectroscopy for determination of composition, and specifically for magnesium content, for each additively manufactured test specimen. The results of these tests are found in Table 6. The averages from the results in Table 6 for each varied parameter is summarized in FIG. 13.

TABLE 6

Compositional Analysis Results of Test Specimens

| Test Specimen | Mg Wt. % After Deposition |
|---|---|
| 4-1 | 0.28 |
| 4-2 | 0.25 |
| 4-3 | 0.33 |
| 4-4 | 0.45 |
| 4-5 | 0.70 |
| 4-6 | 1.09 |
| 4-7 | 0.69 |
| 4-8 | 1.11 |
| 4-9 | 1.18 |
| 4-10 | 1.61 |
| 4-11 | 1.19 |
| 4-12 | 1.66 |

Figure 13:
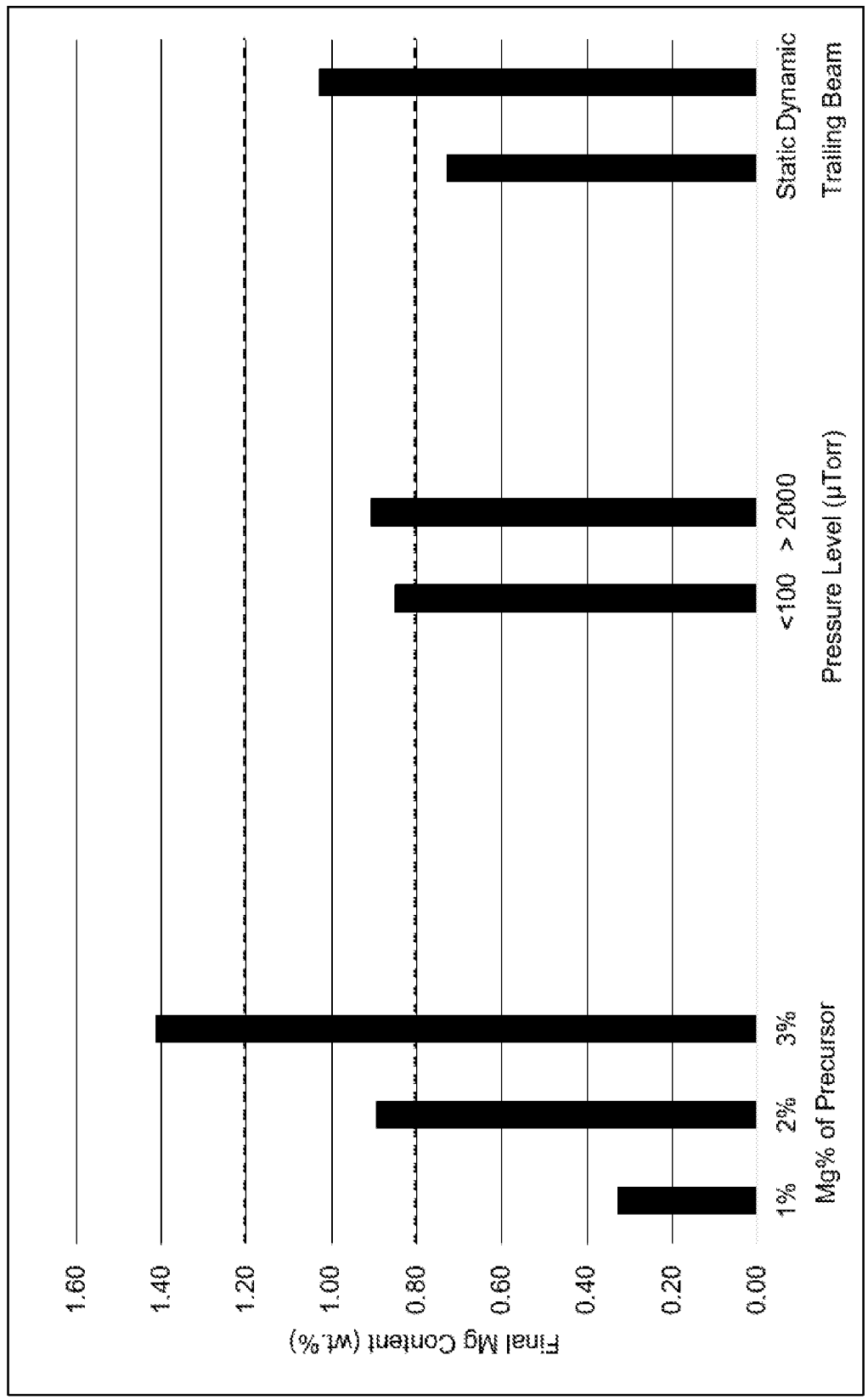
FIG. 13 illustrates experimental test results of spark emission spectroscopy compositional analysis versus the variables of starting magnesium content, chamber pressure, and trailing energy beam configuration according to embodiments of the invention.

FIG. 13 shows the results of spark emission spectroscopy compositional analysis versus the variables of starting magnesium content, chamber pressure, and trailing energy beam configuration. In FIG. 13, the lower threshold level indicated at 0.8 wt. % Mg is considered a minimum magnesium content, and the upper threshold level indicated at 1.2 wt. % Mg is considered a maximum magnesium content, in accordance with the compositional specification of Al 6061 alloy per Aluminum Association *International Alloy Designations and Chemical Composition Limits for Wrought Aluminum and Wrought Aluminum Alloys*—2015 (as illustrated in Table 2). The results in FIG. 13 indicate that those samples with a higher magnesium content (e.g., higher weight percent in the precursor alloy) exhibit increased magnesium content in the processed alloy. It is found that the samples containing about 2 wt. % magnesium content in the precursor alloy fall within the specified compositional limits of Al 6061 alloy. FIG. 13 also illustrates that the trailing beam configuration has a strong influence on final composition, and the average magnesium content of samples additively manufactured with a dynamic trailing energy beam is higher than the average of samples deposited with the static chevron. As shown in FIG. 13, the average magnesium content of those samples processed with the dynamic trailing energy beam is within the specified compositional limits of Al 6061 alloy. It is believed that the enhanced stirring provided by the dynamic trailing energy beam results in this effect. FIG. 13 also shows a higher average magnesium content for those samples additively manufactured with a pressure level of 2,000 microtorr or greater exhibit compared to the average of those samples additively manufactured with a pressure level of 100 microtorr or less.

One or more composition(s), method(s) and apparatus(es), particularly for fusion processing materials that are susceptible to hot cracking, have been described herein. As discussed, an aluminum alloy precursor composition and/or method for fusion processing is provided which reduces hot cracking, improves compositional control, reduces porosity, and/or enhances the strength and ductility of the fusion processed article. The precursor material and fusion process using the same may be utilized for forming an article that meets compositional specifications for aluminum 6061 alloy, while minimizing defects and meeting or exceeding desired strength and ductility requirements. The fusion process may include a leading energy beam for liquefying the raw material to form a melt pool, and a trailing energy beam directed toward a trailing region of the melt pool. The trailing energy beam may be configured to enhance agitation and/or redistribution of liquid in the melt pool to prevent hot cracking, reduce porosity, or improve other characteristics of the solidified part. The method also may improve processing parameters, such as adjusting vacuum level to prevent volatilization of alloying agents, among other considerations.

As discussed above, it is understood that although the present specification discloses certain exemplary embodiments that have particular application to electron beam additive manufacturing (EBAM) of aluminum alloys, the exemplary additive manufacturing process(es) described above (e.g., 1, 100, 200, etc.) are not limited thereto, and may be applicable to other fusion processes, including other additive manufacturing processes or welding processes, which may utilize different materials. For example, the exemplary fusion process(es) described above (e.g., 1, 100, 200, etc.) may be equally applicable to welding techniques, such as laser beam welding, electron beam welding, and/or arc welding (such as gas metal arc welding, gas tungsten arc welding, plasma arc welding, shielded metal arc welding, hybrid arc-laser welding, etc.); or to other additive manufacturing techniques, such as direct energy deposition AM processes, including direct metal deposition, laser deposition wire, laser deposition powder, laser consolidation, laser engineering net shape, electron beam direct melting; powder bed fusion AM processes, including direct metal laser sintering, selective laser sintering, selective laser melting, electron beam melting; and other fusion processes, for example those in which a melt pool is produced and solidified.

By way of example, and not limitation, the exemplary fusion process(es) described above (e.g., 1, 100, 200, etc.) may be used for Selective Laser Sintering (SLS) and Selective Laser Melting (SLM), which are laser-based AM processes that utilized powdered materials. The laser (energy beam) is traced along an x-y plane across a powder bed (raw material) of evenly spread material laid down by a leveler or roller on a build tray. As the laser interacts with the surface of the powdered material, the powder particulates melt to form a melt pool that enables the particles to fuse together to form a solid. During this process, a trailing laser (energy beam) may follow the leading (primary) energy beam, and may be directed toward a trailing region of the melt pool. The leading laser beam and/or trailing laser beam may have each have a pattern, and may be spaced apart at a fixed distance, or variable distance, among other factors described above. As each layer is completed, the powder bed drops incrementally and a roller smooths the powder over the surface of the bed prior to the next pass of the laser for the subsequent layer to be formed and fused with the previous layer. In these processes, the build chamber may be sealed to maintain an inert gas environment to shield the melting powder from oxygen contamination. Once finished, the excess powder is removed, leaving the final additively manufactured part. One advantage of this process is that the powder bed serves as an in-process support structure for overhangs and undercuts, and, therefore, complex shapes with high geometrical accuracy can be manufactured with this type of process.

By way of example, and not limitation, the exemplary fusion process(es) described above (e.g., 1, 100, 200, etc.) may be used for Electron Beam Melting (EBM), which is another powder bed fusion technique similar to SLM/SLS. The difference is the heat source or energy beam, which in the EBM process uses an electron beam, rather than a laser. Thus, the process is carried out under vacuum conditions. A heated tungsten filament emits electrons which are collimated and accelerated to form the electron beam (energy beam). The electron beam is controlled by two magnetic coils. The first coil is a magnetic lens which focuses the beam, and the second coil assembly deflects the focused beam to a desired point on the build platform. The emitted electron beam may be translated through a raster pattern to form a leading energy beam and a trailing energy beam as described above. In a chamber, a metal powder bed (raw material) is formed with a raking mechanism. The computer-controlled electron beam scans over the powder bed to melt the powder and form a melt pool in a predefined pattern. During this process, a trailing electron beam (energy beam) may be directed toward a trailing region of the melt pool. The leading electron beam and/or trailing electron beam may each have a pattern, and may be spaced apart at a fixed distance, or variable distance, among other factors described above. After the melt pool solidifies, then a new powder layer is laid on top of the solidified/scanned material and the process is repeated until all layers are completed.

By way of example, and not limitation, the exemplary fusion process(es) described above (e.g., 1, 100, 200, etc.) may be used for powder-fed systems, such as Laser Metal Deposition (LMD) and Laser Engineered Net Shaping (LENS). In LMD/LENS, a powder (raw material) is blown through a nozzle and directed at a feed region. The powder is then melted by a laser beam (energy beam) to form a melt pool that is deposited on a substrate or already-solidified layer. During this process, a trailing laser (energy beam) may follow the leading (primary) energy beam, and may be directed toward a trailing region of the melt pool. The leading laser beam and/or trailing laser beam may have each have a pattern, and may be spaced apart at a fixed distance, or variable distance, among other factors described above. The melt pool then solidifies to form the re-solidified layer, and the process repeats. This LMD/LENS process(es) are typically precise and may be based on an automated deposition of a layer of material with a thickness varying between 0.1 mm and a few millimeters. The metallurgical bonding of the cladding material with the base material and the absence of undercutting are some features of this process.

By way of example, and not limitation, the exemplary fusion process(es) described above (e.g., 1, 100, 200, etc.) may be used for laser-based wire feed systems, such as wire Laser Metal Deposition (LMD-wire). In LMD-wire, a feed wire (raw material) is passed through a nozzle toward a feed region, whereby the metal wire is melted by a laser (energy beam) to form a melt pool that is deposited on a substrate or previously solidified layer. During this process, a trailing laser (energy beam) may follow the leading (primary) laser beam, and may be directed toward a trailing region of the melt pool. The leading laser beam and/or trailing laser beam may have each have a pattern, and may be spaced apart at a fixed distance, or variable distance, among other factors described above. The LMD-wire process may incorporate inert environment shielding in either an open environment (inert gas surrounding the laser), or in a sealed gas enclosure. This process typically provides higher deposition rates as compared with powder bed and blown powder direct energy deposition.

The foregoing list of alternative processes that may use the exemplary fusion process(es) (e.g., 1, 100, 200, etc.) is intended to be illustrative, and not limiting. It is also understood that one or more features of the exemplary additive manufacturing process(es) described above may be used in other manufacturing processes, for example other fusion processes, such as other additive manufacturing processes or welding, or various other processes, where desirable to (i) prevent hot cracking and/or reduce porosity of the manufactured article; (ii) enhance the characteristics of the manufactured article, such as material strength, material composition, material heat treatability, stress-relieving or annealing, tailorability and flexibility in design or repair; (iii) improve control over the manufacturing process parameters, such as cooling rates or maintaining processing temperatures; (iv) among various other considerations discussed above.

It is understood that although the present specification discloses certain exemplary embodiments that have particular application to processing of aluminum alloys, such as Al 6061 or the exemplary aluminum alloy precursor material, the exemplary fusion process(es) described above (e.g., 1, 100, 200, etc.), and the various alternatives, are not limited thereto, and may be applicable to other materials. For example, other materials may include one or more metals, metal alloys, or non-metals. The metal or alloy may include: titanium or titanium alloys, nickel or nickel alloys, Inconel, tantalum, tungsten, niobium, stainless steels, austenitic steels, aluminum or aluminum alloys. Other similar metal or metal alloys; or other metal or metal alloys which may be susceptible to hot cracking also may be used.

It is understood that embodiments of the subject matter described in this specification can be implemented in combination with digital electronic circuitry, controllers, processors, computer software, firmware, and/or hardware. For example, embodiments may be implemented in an additive manufacturing or welding system that uses one or more modules of computer program instructions encoded on a non-transitory computer-readable medium for execution by, or to control the operation of, data processing apparatus. In the flow diagram(s), blocks may denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of them. The controller may include all apparatus, devices, and machines for processing data, including by way of example a programmable processor, a computer, or multiple processors or computers. The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry. To provide for interaction with a user, embodiments may be implemented using a computer having a display device and an input device. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. Embodiments may include a computing system that includes a back-end component (e.g., as a data server), or that includes a middleware component (e.g., an application server), or that includes a front-end component (e.g., a client computer having a graphical user interface through which a user can interact with an implementation of the subject matter described is this specification), or any combination of one or more such back-end, middleware, or front-end components. The components of the system can be interconnected by any form or medium of digital data communication.

According to an aspect of the present disclosure, a method of fusion processing includes: providing a raw material in solid state form; exposing the raw material to a leading energy beam thereby liquefying the raw material; forming a melt pool with the liquefied raw material, the melt pool having a leading region and a trailing region; and exposing the trailing region of the melt pool to a trailing energy beam.

According to another aspect of the present disclosure, an aluminum alloy precursor material for fusion processing is provided, the aluminum alloy precursor material having a chemical composition, in weight % of the aluminum alloy precursor material, including: Al from 50% or greater; Si from 0.40 to 0.80%; Cu from 0.15 to 0.40%; Mg from 1.0 to 5.0%; Cr from 0.04 to 0.35%; Ti from 0.05 to 0.15%; Fe from 0.0 to 0.7%; Mn from 0.0 to 0.15%; Zn from 0.0 to 0.005%; at least one additional grain refiner, such as boron which may be present from 0.001 to 0.05% and may be combined with at least a portion of the titanium in the form of titanium diboride; one or more other impurities from 0.0 to 0.05% for each of the one or more other impurities, the total amount of the one or more other impurities may be from 0.0 to 0.10%.

According to another aspect of the present disclosure, a method of forming an aluminum alloy article by fusion processing includes: obtaining an aluminum alloy precursor material in solid state form, the aluminum alloy precursor material having a chemical composition, in weight % of the aluminum alloy precursor material, including: Al from 50% or greater; Si from 0.40 to 0.80%; Cu from 0.15 to 0.40%; Mg from greater than 1.2% to 5.0%; Cr from 0.04 to 0.35%; Ti from 0.0 to 0.15%; Fe from 0.0 to 0.7%; Mn from 0.0 to 0.15%; Zn from 0.0 to 0.005%; exposing the aluminum alloy precursor material to at least one direct energy source sufficient to heat and liquefy the precursor material; forming a melt pool with the liquefied precursor material on a substrate, wherein the forming the melt pool with the liquefied precursor material is performed as the at least one direct energy source and/or the substrate move relative to each other in a travel direction; solidifying the melt pool to form the aluminum alloy article, the aluminum alloy article having a chemical composition, in weight % of the aluminum alloy forming the article, including: Al from 50% or greater; Si from 0.40 to 0.80%; Cu from 0.15 to 0.40%; Mg from 0.8 to 1.2%; Cr from 0.04 to 0.35%; Ti from 0.0 to 0.15%; Fe from 0.0 to 0.7%; Mn from 0.0 to 0.15%; Zn from 0.0 to 0.005%.

According to another aspect of the present disclosure, a method of fusion processing includes: obtaining an aluminum alloy precursor material in solid state form, the aluminum alloy precursor material having a chemical composition, in weight % of the aluminum alloy precursor material, including: Al from 50% or greater; Si from 0.40 to 0.80%; Cu from 0.15 to 0.40%; Mg from 0.8 to 5.0%; Cr from 0.04 to 0.35%; Ti from 0.0 to 0.15%; Fe from 0.0 to 0.7%; Mn from 0.0 to 0.15%; Zn from 0.0 to 0.25%; exposing the aluminum alloy precursor material to a leading energy beam, thereby liquefying the precursor material; forming a melt pool with the liquefied precursor material, wherein the melt pool has a leading region and a trailing region; and exposing the trailing region of the melt pool to a trailing energy beam.

One or more of the foregoing aspects may include one or more of the following additional features alone or in combination.

The aluminum alloy precursor material further may include at least one additional grain refiner.

The at least one additional grain refiner may include at least one of boron, titanium-carbon, zirconium, vanadium, and scandium.

The boron may be present, in weight percent of the aluminum alloy precursor material, from 0.001 to 0.05%.

The boron may be present, in weight percent of the aluminum alloy precursor material, from 0.001 to 0.002%.

The boron may be combined with at least a portion of the titanium in the form of titanium diboride.

The titanium-carbon may form titanium carbide (TiC).

The titanium may be present, in weight percent of the aluminum alloy precursor material, from 0.05 to 0.15%, more particularly from 0.10 to 0.15%.

The magnesium may be present, in weight percent of the aluminum alloy precursor material, from 1.3% to 5.0%, or more particularly 1.5 to 3.0%, or even more particularly from 2.0% to 3.0%.

The aluminum alloy precursor material may be free of zinc.

The aluminum alloy precursor material may include one or more other impurities, in weight percent of the aluminum alloy precursor material, from 0.0 to 0.05% for each of the one or more other impurities; wherein the total amount of the one or more other impurities is, in weight percent of the aluminum alloy precursor material, from 0.0 to 0.10%.

The aluminum may be present, in weight percent of the aluminum alloy precursor material, from 90 to 99%, such as about 91, 92, 93, 94, 95, 96, 97, 98, or 99%, more particularly from about 92.2 to about 98.4%, such as about 92.2, 92.265, 93, 94, 95, 96, 97, 98, 98.359, or 98.4%.

In some embodiments, the aluminum alloy precursor material may have a composition, in weight % of the aluminum alloy precursor material, consisting only of: Al from 50% or greater; Si from 0.40 to 0.80%; Cu from 0.15 to 0.40%; Mg from 1.0 to 5.0%, more particularly from greater than 1.2% to 5.0%; Cr from 0.04 to 0.35%; Ti from 0.05 to 0.15%; Boron from 0.001 to 0.05%, Fe from 0.0 to 0.7%; Mn from 0.0 to 0.15%; Zn from 0.0 to 0.005%; one or more other impurities from 0.0 to 0.05% for each of the one or more other impurities, wherein the total amount of the one or more minor impurities is from 0.0 to 0.10%.

The method may be carried out without adding one or more materials that may be independent of the supplied precursor material to the melt pool, for example, filler materials.

The aluminum alloy precursor material may be supplied in wire or powder form.

The at least one direct energy source may heat the aluminum alloy precursor material beyond about 580 degrees Celsius to liquefy the precursor material.

The method further may include: after the solidifying step, heat treating the aluminum alloy article.

The at least one direct energy source may be a leading energy beam.

The aluminum alloy precursor material according to one or more of the foregoing may be considered a raw material for fusion processing.

The melt pool may have a leading region and a trailing region; wherein the leading region of the melt pool is proximal to the leading energy beam as the leading energy beam and/or the substrate move in the travel direction; and wherein the trailing region of the melt pool trails the leading region as the leading energy beam and/or the substrate move in the travel direction.

The method may further include exposing the trailing region of the melt pool to a trailing energy beam.

The raw material may be a metal or metal alloy, and the trailing region of the melt pool exposed to the trailing energy beam may include a solid-liquid phase.

The trailing energy beam may be configured to disrupt formation of a dendritic microstructure in the trailing region of the melt pool; and/or may be configured to agitate, stir, and/or redistribute liquid constituents in the trailing region of the melt pool for reducing hot cracking and/or porosity when the melt pool solidifies.

The trailing region of the melt pool may include a liquid interface, a solid interface, and a transition region between the liquid interface and the solid interface.

The trailing energy beam may be configured in a pattern that corresponds to a shape of the liquid interface, the solid interface, or the transition region along an x-y plane.

The trailing energy beam may be configured in a concave pattern that opens toward the leading region of the melt pool.

The trailing energy beam pattern may be concave or convex toward the melt pool in the travel direction.

The trailing energy beam may be configured in a pattern selected from the group consisting of: chevron-shaped, arc-shaped, crescent-shaped, or parabolic-shaped.

The trailing energy beam may have a lateral width in a direction orthogonal to the travel direction, the lateral width being at least as wide or wider than a lateral width of the trailing region of the melt pool.

The leading energy beam may be configured in a pattern that may be different than a pattern of the trailing energy beam.

The leading energy beam may be configured in a pattern selected from the group consisting of: circular, elliptical, and concentric rings.

The trailing energy beam may be spaced apart from the leading energy beam at a fixed distance as the respective energy beams move together in the travel direction.

The trailing energy beam may be spaced apart from the leading energy beam so that the trailing energy beam may be maintained in a transition region of the trailing region, the transition region being between a liquid interface and a solid interface of the melt pool and including a solid-liquid phase.

The trailing energy beam may be configured to agitate the trailing region of the melt pool for reducing hot cracking and/or porosity when the melt pool solidifies.

The trailing energy beam may be configured to redistribute liquid constituents in the trailing region of the melt pool so as to replenish lost volume at solidifying regions of the melt pool.

The trailing energy beam may be spaced apart from the leading energy beam at varying distances as the leading energy beam moves in a travel direction.

The trailing energy beam may move back and forth within the trailing region of the melt pool between a first position that may be closer to the leading energy beam, and a second position that may be further away from the leading energy beam.

The trailing energy beam may follow the leading energy beam by a first distance at a first location along a path in the travel direction, the trailing energy beam may follow the leading energy beam by a second distance at a second location along the path in the travel direction, the second distance being greater than the first distance, and the trailing energy beam may cycle between the first distance and the second distance, and optionally one or more intermediate distances, as the leading energy beam moves in the travel direction.

The distance between the trailing energy beam and the leading energy beam progressively may increase to a first intermediate distance and a second intermediate distance before reaching the second distance.

The trailing energy beam may cycle back to the first distance after reaching the second distance.

The second distance may represent a maximum distance that the trailing energy beam may be spaced apart from the leading energy beam, the first distance may be at 25% of the maximum distance, the first intermediate distance may be at 50% of the maximum distance, and the second intermediate distance may be at 75% of the maximum distance.

After the trailing energy beam is at the second distance and before the trailing energy beam cycles back to the first distance, the trailing energy beam may be deactivated such that only the leading energy beam may be utilized.

The trailing energy beam may cycle from the first distance to the second distance, and back to the first distance after 100 cycles; and optionally, the respective beams may be rastered at a rate of 400 Hz.

The trailing energy beam may dwell at each of the respective distances for the same amount of time.

The providing the raw material may include feeding the raw material to a feed region.

The leading energy beam and the trailing energy beam respectively may be electron beams, laser beams, electric arcs, and/or plasma arcs, or combinations of the foregoing.

The forming the melt pool with the liquefied raw material may include depositing the liquefied raw material onto a substrate.

The leading energy beam and the trailing energy beam may move in the travel direction relative to the substrate.

The primary or leading energy beam may be from a different source from the secondary or trailing energy beam.

The leading energy beam may be emitted from the same source as the trailing energy beam.

The source may emit an emitted energy beam that may be translated through a raster pattern including a leading energy beam pattern defined by the leading energy beam, and including a trailing energy beam pattern defined by the trailing energy beam.

The trailing energy beam may have a power level, power density, voltage potential, and/or current that may be different than a power level, power density, voltage potential, and/or current of the leading energy beam.

The trailing energy beam may have a power level, power density, and/or beam pattern sufficient to prevent hot cracking as the melt pool solidifies.

The trailing energy beam may have a power level, power density, and/or beam pattern sufficient to agitate the trailing region of the melt pool.

The trailing energy beam may have a power level, power density, and/or beam pattern sufficient to break-up a dendritic microstructure that has formed in the trailing region of the melt pool.

The trailing energy beam may have a power level, power density, and/or beam pattern sufficient to increase replenishment of the solidifying melt.

The trailing energy beam may have a power level, power density, and/or beam pattern sufficient to re-melt and redistribute solidified constituents.

The trailing energy beam may have a power level, power density, and/or beam pattern sufficient to stress relieve or anneal the solidified material from the solidification of the molten pool.

The trailing energy beam may have a power level, power density, and/or beam pattern that does not necessarily reheat or re-melt material to the degree provided by the leading energy beam.

The combined power levels of the leading energy beam and the trailing energy beam represents a total power level, and the distribution of the total power level may be split between the leading energy beam (L) and the trailing energy beam (T) by a ratio in the range of 85:15 (L:T) to 99:1 (L:T).

The distribution of the total power level may be split between the leading energy beam (L) and the trailing energy beam (T) by a ratio of 95:5 (L:T).

The combined power levels of the leading energy beam and the trailing energy beam represents a total power level, and wherein the total power level may be in the range of 1 kW to 10 kW, more particularly 2 kW to 5 kW.

The total power level may be in the range of 2 kW to 3 kW.

The combined voltage potentials of the leading energy beam and the trailing energy beam may represent a total voltage potential, and wherein the total voltage potential may be in the range of 25 kV to 35 kV.

The total voltage potential may be 27 kV.

The combined currents of the leading energy beam and the trailing energy beam may represent a total current, and wherein the total current may be in the range of 80 mA to 143 mA.

A source may emit an emitted energy beam that may be translated through a raster pattern to define the leading energy beam and the trailing energy beam, and the total power level, the total voltage potential, and/or the total current may represent a power level, voltage potential, and/or current of the emitted energy beam.

Translating of the energy beam may include translating the leading beam and trailing beam, may include deflecting the beam or beams, which may be done with an electromagnetic coil, which may be translated from point to point at a substantially constant clock rate and/or variable clock rate.

The raw material may be a metal wire, and the providing the raw material includes feeding the metal wire at a predetermined wire feed rate to a feed region.

The wire feed rate may be in the range of 30 inches per minute to 55 inches per minute.

The leading energy beam may move in the travel direction relative to a substrate at a travel speed in the range of 15 inches per minute to 20 inches per minute.

The fusion process may be conducted in a vacuum chamber.

The raw material may be a metal alloy having one or more alloying agents that contribute to increasing strength of the metal alloy, the one or more alloying agents each have a processing vapor pressure, which may be the intrinsic vapor pressure of the alloying agent at a processing temperature, the processing temperature being at a temperature of the melt pool, and the vacuum chamber may be set to a pressure level during the fusion process, the pressure level being 500 microtorr or greater for reducing vaporization of the one or more alloying agents during the fusion process.

The pressure level may be equal to or greater than the processing vapor pressure of the one or more alloying agents for reducing vaporization of the one or more alloying agents during the fusion process.

The metal alloy may be Al 6061 or derivative thereof and the processing temperature may be in the range of 580 degrees Celsius to 652 degrees Celsius.

A pressure level of the vacuum chamber may be 100 microtorr or greater for reducing vaporization of at least one of the magnesium and the zinc.

A pressure level of the vacuum chamber may be 1,000 microtorr or greater, more particularly 2,000 microtorr or greater.

The pressure level of the vacuum chamber may be in the range of 500 microtorr to 3,000 microtorr, more particularly in the range of 1,000 microtorr to 3,000 microtorr, or more particularly in the range of 2,000 microtorr to 3,000 microtorr.

The vacuum chamber may be back-filled with an inert gas, more particularly, helium.

The substrate may be configured to support the liquefied precursor material as a molten pool deposit, the substrate providing a heat transfer medium for extracting heat from the molten pool deposit; and a chill plate may be in thermal communication with the substrate for maintaining an interpass temperature at or below a predetermined temperature level.

The interpass temperature may be maintained at or below the predetermined temperature level by actively cooling a chill plate in thermal communication with the substrate.

The actively cooling the chill plate includes circulating a chilled fluid, more particularly water, through fluid passages in the chill plate.

The interpass temperature may be maintained at or below 65 degrees Celsius, more particularly at or below 27 degrees Celsius.

A thermally-conductive material may be interposed between the chill plate and the substrate.

The thermally-conductive material may be a flexible and/or compressible material, more particularly, self-adhered graphite particles.

The fusion process may further include the steps: solidifying the melt pool to form a re-solidified layer; and exposing the re-solidified layer to the trailing energy beam for stress relieving and/or annealing the re-solidified layer.

The fusion process may be a welding process, including: arc welding, the at least one direct energy source may be an electric arc; electron beam welding, the at least one direct energy source may be an electron beam; laser welding, the at least one direct energy source may be a laser beam; or other welding processes in which a melt pool may be produced and solidified; and the solidified aluminum alloy article may be a weld.

The fusion process may be an additive manufacturing process, including: direct energy deposition, including direct metal deposition, laser deposition wire, laser deposition powder, laser consolidation, laser engineering net shape, electron beam direct melting; powder bed fusion, including direct metal laser sintering, selective laser sintering, selective laser melting, electron beam melting; or other additive manufacturing methods in which a melt pool may be produced and solidified; and the method further includes: solidifying the melt pool to form a re-solidified layer; and repeating at one or more locations for building the aluminum alloy article as a three-dimensional structure re-solidified layer by re-solidified layer.

The raw material may be a metal or metal alloy selected from the group consisting of: titanium or titanium alloys, nickel or nickel alloys, Inconel, tantalum, tungsten, niobium, stainless steels, austenitic steels, and aluminum or aluminum alloys.

The melt pool may be autogenously formed and solidified independent of a separate filler material being added to the melt pool.

The method may further include monitoring a condition of one or more of the melt pool, the feed region, and the trailing region substantially in real time for the occurrence of any deviation from a preselected condition.

The monitoring may use feedback information from the leading energy beam or trailing energy beam, such as from scatter or reflection.

The monitoring may use an imaging system for real time monitoring and feedback to a controller; and/or may use an in-situ temperature sensor for monitoring interpass temperature and feeding the information back to a controller for control of temperature.

The method may further include automatically altering a processing condition based upon information obtained from the monitoring step, such as altering the power level, power density, and/or beam pattern of one or more of the lead energy beam or trailing energy beam, which may be performed by at least one control device that is in electrical signaling communication with the source of the energy beam, such as an electron beam gun; and optionally during the monitoring a detection signal that is transmitted to the at least one control device upon detection of scatter and which is indicative of a characteristic of the scatter, the detection signal information from the signal may compared with a predetermined value, and based upon such comparison the control device issues a control signal to the energy beam generating device.

According to another aspect of the present disclosure, a computer program may be provided that is configured to perform the method steps according to any of the preceding features, particularly, a non-transitory computer readable medium having stored thereon a program configured to perform the method steps according to any of the preceding features.

According to another aspect of the disclosure, an article made by the fusion processing process according to any of the preceding claims may be provided, more particularly, the article may be an aircraft component, a rocket component, a marine component, a spacecraft component, an automotive vehicle component, a turbine component, a radar component.

According to another aspect of the disclosure, a fusion processing apparatus for carrying out the steps according to any preceding claim may be provided.

According to another aspect of the disclosure, an article of manufacture produced by the steps according to any preceding claim may be provided.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The transitional words or phrases, such as "comprising," "including," "having," "involving," and the like, are to be understood to be open-ended, i.e., to mean including but not limited to.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of forming an aluminum alloy article by fusion processing, comprising:
    obtaining an aluminum alloy precursor material in solid state form, the aluminum alloy precursor material having a chemical composition, in weight % of the aluminum alloy precursor material, comprising:
        Al from 50% or greater;
        Si from 0.40% to 0.80%;
        Cu from 0.15% to 0.40%;
        Mg from 2.5% to 5.0%;
        Cr from 0.04% to 0.35%;
        Ti from 0.0% to 0.15%;
        Fe from 0.0% to 0.7%;
        Mn from 0.0% to 0.15%; and
        Zn from 0.0% to 0.005%;
    exposing the aluminum alloy precursor material to at least one direct energy source sufficient to heat and liquefy the precursor material;
    forming a melt pool with the liquefied precursor material on a substrate, wherein the forming the melt pool with the liquefied precursor material is performed as at least one of the at least one direct energy source or the substrate move relative to each other in a travel direction;
    solidifying the melt pool to form the aluminum alloy article, the aluminum alloy article having a chemical composition, in weight % of the aluminum alloy forming the article, comprising:
        Al from 50% or greater;
        Si from 0.40% to 0.80%;
        Cu from 0.15% to 0.40%;
        Mg from 0.8% to 1.2%;
        Cr from 0.04% to 0.35%;
        Ti from 0.0% to 0.15%;
        Fe from 0.0% to 0.7%;
        Mn from 0.0% to 0.15%; and
        Zn from 0.0% to 0.005%;

wherein the fusion processing is an electron beam additive manufacturing process,
wherein the method further comprises:
(i) providing the aluminum alloy precursor material as a wire;
(ii) feeding the wire of aluminum alloy precursor material to a feed region; and
(iii) exposing the wire of aluminum alloy precursor material to the at least one direct energy source at the feed region to thereby heat and liquefy the wire, wherein the at least one direct energy source is an electron beam;
wherein the solidifying the melt pool includes forming a re-solidified layer that trails the melt pool;
wherein the method further includes building the aluminum alloy article as a three-dimensional structure re-solidified layer by re-solidified layer;
wherein the melt pool has a leading region and a trailing region, the leading region being characterized by a liquid phase, and the trailing region being characterized by a solid-liquid phase between a liquid interface and a solid interface of the melt pool; and
the method further comprising: exposing the trailing region of the melt pool to a trailing energy beam that is configured to redistribute liquid constituents in the trailing region to thereby disrupt formation of a dendritic microstructure and reduce hot cracking when the melt pool solidifies.

2. The method according to claim 1, wherein the aluminum alloy precursor material further comprises at least one additional grain refiner.

3. The method according to claim 2, wherein the at least one additional grain refiner includes at least one of boron, titanium-carbon, zirconium, vanadium, and scandium.

4. The method according to claim 3, wherein the at least one additional grain refiner includes boron, and wherein the boron is present, in weight percent of the aluminum alloy precursor material, from 0.001% to 0.05%.

5. The method according to claim 3,
wherein the at least one additional grain refiner includes boron, and
wherein the boron is combined with at least a portion of the titanium in the form of titanium diboride.

6. The method according to claim 1, wherein the titanium of the aluminum alloy precursor material is present, in weight percent of the aluminum alloy precursor material, from 0.05% to 0.15%.

7. The method according to claim 1,
wherein the magnesium of the aluminum alloy precursor material is present, in weight percent of the aluminum alloy precursor material, from 3.0% to 5.0%.

8. The method according to claim 1, wherein the aluminum alloy precursor material is free of zinc.

9. A method of forming an aluminum alloy article by fusion processing, comprising:
obtaining an aluminum alloy precursor material in solid state form, wherein the aluminum alloy precursor material has a composition, in weight % of the aluminum alloy precursor material, consisting of:
Al from 50% or greater;
Si from 0.40% to 0.80%;
Cu from 0.15% to 0.40%;
Mg from greater than 1.2% to 5.0% or less;
Cr from 0.04% to 0.35%;
Ti from 0.05% to 0.15%;
Boron from 0.001% to 0.05%;
Fe from 0.0% to 0.7%;
Mn from 0.0% to 0.15%;
Zn from 0.0% to 0.005%; and
one or more other impurities from 0.0% to 0.05% for each of the one or more other impurities, wherein the total amount of the one or more other impurities is from 0.0% to 0.10%;
exposing the aluminum alloy precursor material to at least one direct energy source sufficient to heat and liquefy the precursor material;
forming a melt pool with the liquefied precursor material on a substrate, wherein the forming the melt pool with the liquefied precursor material is performed as at least one of the at least one direct energy source or the substrate move relative to each other in a travel direction;
solidifying the melt pool to form the aluminum alloy article, the aluminum alloy article having a chemical composition, in weight % of the aluminum alloy forming the article, comprising:
Al from 50% or greater;
Si from 0.40% to 0.80%;
Cu from 0.15% to 0.40%;
Mg from 0.8% to 1.2%;
Cr from 0.04% to 0.35%;
Ti from 0.0% to 0.15%;
Fe from 0.0% to 0.7%;
Mn from 0.0% to 0.15%; and
Zn from 0.0% to 0.005%.

10. The method according to claim 1, wherein the method is carried out without adding one or more materials that are independent of the supplied precursor material to the melt pool.

11. A method of forming an aluminum alloy article by fusion processing, comprising:
obtaining an aluminum alloy precursor material in solid state form, the aluminum alloy precursor material having a chemical composition, in weight % of the aluminum alloy precursor material, comprising:
Al from 50% or greater;
Si from 0.40% to 0.80%;
Cu from 0.15% to 0.40%;
Mg from greater than 1.2% to 5.0% or less;
Cr from 0.04% to 0.35%;
Ti from 0.0% to 0.15%;
Fe from0.0% to 0.7%;
Mn from 0.0% to 0.15%; and
Zn from 0.0% to 0.005%;
exposing the aluminum alloy precursor material to at least one direct energy source sufficient to heat and liquefy the precursor material;
forming a melt pool with the liquefied precursor material on a substrate, wherein the forming the melt pool with the liquefied precursor material is performed as at least one of the at least one direct energy source or the substrate move relative to each other in a travel direction;
solidifying the melt pool to form the aluminum alloy article, the aluminum alloy article having a chemical composition, in weight % of the aluminum alloy forming the article, comprising:
Al from 50% or greater;
Si from 0.40% to 0.80%;
Cu from 0.15% to 0.40%;
Mg from 0.8% to 1.2%;
Cr from 0.04% to 0.35%;
Ti from 0.0% to 0.15%;
Fe from 0.0% to 0.7%;

Mn from 0.0% to 0.15%; and
Zn from 0.0% to 0.005%;
wherein the at least one direct energy source is a leading energy beam, and wherein the melt pool has a leading region and a trailing region;
wherein the leading region of the melt pool is proximal to the leading energy beam as at least one of the leading energy beam or the substrate move in the travel direction; and
wherein the trailing region of the melt pool trails the leading region as at least one of the leading energy beam or the substrate move in the travel direction;
the method further comprising: exposing the trailing region of the melt pool to a trailing energy beam;
wherein the leading region of the melt pool is a liquid-phase region, and wherein the trailing region of the melt pool is a transitional solid-liquid phase region between a liquid interface and a solid interface of the melt pool; and
wherein the trailing energy beam is configured to redistribute liquid constituents in the trailing region to thereby reduce hot cracking when the melt pool solidifies.

12. The method according to claim 11, wherein the trailing energy beam has at least one of a power level, power density, voltage potential, or current that is different than a corresponding at least one of power level, power density, voltage potential, or current of the leading energy beam.

13. The method according to claim 11, wherein the trailing energy beam is configured to disrupt formation of a dendritic microstructure in the trailing region of the melt pool; or is configured to agitate, stir, or redistribute liquid constituents in the trailing region of the melt pool.

14. The method according to claim 11, wherein the leading energy beam is emitted from the same at least one direct energy source as the trailing energy beam, the at least one direct energy source emitting an emitted energy beam that is translated through a raster pattern including a leading energy beam pattern defined by the leading energy beam, and including a trailing energy beam pattern defined by the trailing energy beam.

15. The method according to claim 11, wherein the fusion process is conducted in a vacuum chamber; and
wherein a pressure level of the vacuum chamber is 100 microtorr or greater thereby reducing vaporization of at least one of the magnesium and the zinc.

16. The method according to claim 11, wherein the substrate is configured to support the liquefied precursor material as a molten pool deposit, the substrate providing a heat transfer medium for extracting heat from the molten pool deposit; and wherein a chill plate is in thermal communication with the substrate for maintaining a constant interpass temperature.

17. The method according to claim 11,
wherein the method is a welding process or an additive manufacturing process, the welding process including:
arc welding, wherein the at least one direct energy source is an electric arc;
electron beam welding, wherein the at least one direct energy source is an electron beam;
laser welding, wherein the at least one direct energy source is a laser beam; or
other welding processes in which a melt pool is produced and solidified; and
wherein the solidified aluminum alloy article is a weld;
the additive manufacturing process including:
direct energy deposition, including direct metal deposition, laser deposition wire, laser deposition powder, laser consolidation, laser engineering net shape, electron beam direct melting;
powder bed fusion, including direct metal laser sintering, selective laser sintering, selective laser melting, electron beam melting; or
other additive manufacturing methods in which a melt pool is produced and solidified; and
the additive manufacturing process further comprising:
solidifying the melt pool to form a re-solidified layer; and
repeating at one or more locations for building the aluminum alloy article as a three-dimensional structure re-solidified layer by re-solidified layer.

18. The method according to claim 11,
wherein the fusion processing is an electron beam additive manufacturing process,
wherein the method further comprises:
providing the aluminum alloy precursor material as a wire;
feeding the wire of aluminum alloy precursor material to a feed region; and
exposing the wire of aluminum alloy precursor material to the at least one direct energy source at the feed region to thereby heat and liquefy the wire, wherein the at least one direct energy source is an electron beam;
wherein the solidifying the melt pool includes forming a re-solidified layer that trails the melt pool; and
wherein the method further includes building the aluminum alloy article as a three-dimensional structure re-solidified layer by re-solidified layer.

19. A method of forming an aluminum alloy article by fusion processing, comprising:
obtaining an aluminum alloy precursor material in solid state form, the aluminum alloy precursor material having a chemical composition, in weight % of the aluminum alloy precursor material, comprising:
Al from 50% or greater;
Si from 0.40% to 0.80%;
Cu from 0.15% to 0.40%;
Mg from greater than 1.2% to 5.0% or less;
Cr from 0.04% to 0.35%;
Ti from 0.0% to 0.15%;
Fe from 0.0% to 0.7%;
Mn from 0.0% to 0.15%; and
Zn from 0.0% to 0.005%;
exposing the aluminum alloy precursor material to at least one direct energy source sufficient to heat and liquefy the precursor material;
forming a melt pool with the liquefied precursor material on a substrate, wherein the forming the melt pool with the liquefied precursor material is performed as at least one of the at least one direct energy source or the substrate move relative to each other in a travel direction;
solidifying the melt pool to form the aluminum alloy article, the aluminum alloy article having a chemical composition, in weight % of the aluminum alloy forming the article, comprising:
Al from 50% or greater;
Si from 0.40% to 0.80%;
Cu from 0.15% to 0.40%;
Mg from 0.8% to 1.2%;
Cr from 0.04% to 0.35%;
Ti from 0.0% to 0.15%;

Fe from 0.0% to 0.7%;
Mn from 0.0% to 0.15%; and
Zn from 0.0% to 0.005%;
wherein the at least one direct energy source is a leading energy beam, and wherein the melt pool has a leading region and a trailing region;
wherein the leading region of the melt pool is proximal to the leading energy beam as at least one of the leading energy beam or the substrate move in the travel direction; and
wherein the trailing region of the melt pool trails the leading region as at least one of the leading energy beam or the substrate move in the travel direction;
the method further comprising: exposing the trailing region of the melt pool to a trailing energy beam; and
wherein the trailing energy beam is configured in a concave pattern that opens toward the leading region of the melt pool.

20. A method of forming an aluminum alloy article by fusion processing, comprising:
obtaining an aluminum alloy article by fusion processing, comprising: obtaining an aluminum alloy precursor material in solid state form, the aluminum alloy precursor material having a chemical composition, in weight % of the aluminum alloy precursor material, comprising:
Al from 50% or greater;
Si from 0.40% to 0.80%;
Cu from 0.15% to 0.40%;
Mg from greater than 1.2% to 5.0% or less;
Cr from 0.04% to 0.35%;
Ti from 0.0% to 0.15%;
Fe from 0.0% to 0.7%;
Mn from 0.0% to 0.15%; and
Zn from 0.0% to 0.005%;
exposing the aluminum alloy precursor material to at least one direct energy source sufficient to heat and liquefy the precursor material;
forming a melt pool with the liquefied precursor material on a substrate, wherein the forming the melt pool with the liquefied precursor material is performed as at least one of the at least one direct energy source or the substrate move relative to each other in a travel direction;
solidifying the melt pool to form the aluminum alloy article, the aluminum alloy article having a chemical composition, in weight % of the aluminum alloy forming the article, comprising:
Al from 50% or greater;
Si from 0.40% to 0.80%;
Cu from 0.15% to 0.40%;
Mg from 0.8% to 1.2%;
Cr from 0.04% to 0.35%;
Ti from 0.0% to 0.15%;
Fe from 0.0% to 0.7%;
Mn from 0.0% to 0.15%; and
Zn from 0.0% to 0.005%;
wherein the at least one direct energy source is a leading energy beam, and wherein the melt pool has a leading region and a trailing region;
wherein the leading region of the melt pool is proximal to the leading energy beam as at least one of the leading energy beam or the substrate move in the travel direction; and
wherein the trailing region of the melt pool trails the leading region as at least one of the leading energy beam or the substrate move in the travel direction;
the method further comprising: exposing the trailing region of the melt pool to a trailing energy beam; and
wherein the trailing energy beam is spaced apart from the leading energy beam at varying distances as the leading energy beam moves in a travel direction.

21. The method according to claim 20,
wherein the trailing energy beam follows the leading energy beam by a first distance at a first location along a path in the travel direction;
wherein the trailing energy beam follows the leading energy beam by a second distance at a second location along the path in the travel direction, the second distance being greater than the first distance; and
wherein the trailing energy beam cycles between the first distance and the second distance, and optionally one or more intermediate distances, as the leading energy beam moves in the travel direction.

22. The method according to claim 20,
wherein the distance between the trailing energy beam and the leading energy beam progressively increases to a first intermediate distance and a second intermediate distance before reaching the second distance;
wherein the second distance represents a maximum distance that the trailing energy beam is spaced apart from the leading energy beam;
wherein the first distance is at 25% of the maximum distance;
wherein the first intermediate distance is at 50% of the maximum distance;
wherein the second intermediate distance is at 75% of the maximum distance; and
wherein the trailing energy beam cycles back to the first distance after reaching the second distance.

23. The method according to claim 21, further including a step where, after the trailing energy beam is at the second distance and before the trailing energy beam cycles back to the first distance, the trailing energy beam is deactivated such that only the leading energy beam is utilized.

* * * * *